(12) United States Patent
Nomoto et al.

(10) Patent No.: US 8,258,648 B2
(45) Date of Patent: Sep. 4, 2012

(54) WINDMILL FOR WIND POWER GENERATOR AND WIND POWER GENERATOR

(75) Inventors: Kazuki Nomoto, Kagoshima (JP);
Kazuomi Nomoto, Kagoshima (JP);
Manabu Yagi, Kagoshima (JP)

(73) Assignee: Birumen Kagoshima Co., Ltd.,
Kagoshima-Shi, Kagoshima (JP)

( * ) Notice: Subject to any disclaimer, the term of this patent is extended or adjusted under 35 U.S.C. 154(b) by 0 days.

(21) Appl. No.: 13/379,089

(22) PCT Filed: Nov. 9, 2010

(86) PCT No.: PCT/JP2010/069962
§ 371 (c)(1),
(2), (4) Date: Dec. 19, 2011

(87) PCT Pub. No.: WO2012/049783
PCT Pub. Date: Apr. 19, 2012

(65) Prior Publication Data
US 2012/0153631 A1 Jun. 21, 2012

(30) Foreign Application Priority Data
Oct. 14, 2010 (JP) .................................. 2010-231793

(51) Int. Cl.
*F02D 7/00* (2006.01)
*F03D 11/02* (2006.01)
(52) U.S. Cl. ....................... 290/55; 290/44; 415/124.1
(58) Field of Classification Search .................... 290/43, 290/44, 54, 55; 415/124.1, 4.3
See application file for complete search history.

(56) References Cited

U.S. PATENT DOCUMENTS

| 4,239,977 | A | * | 12/1980 | Strutman | 290/44 |
| 4,366,386 | A | * | 12/1982 | Hanson | 290/44 |
| 4,653,982 | A | | 3/1987 | Kojima | |
| 5,476,293 | A | * | 12/1995 | Yang | 290/4 C |
| 6,870,281 | B2 | * | 3/2005 | Weitkamp | 290/55 |
| 7,083,378 | B2 | * | 8/2006 | Hur | 415/4.3 |
| 7,560,824 | B2 | * | 7/2009 | Hehenberger | 290/44 |
| 7,816,798 | B2 | * | 10/2010 | Hehenberger | 290/44 |
| 8,143,734 | B2 | * | 3/2012 | Steudel et al. | 290/44 |
| 8,147,183 | B2 | * | 4/2012 | Madge et al. | 415/124.1 |
| 2010/0129220 | A1 | | 5/2010 | Tsai | |

FOREIGN PATENT DOCUMENTS

DE 4132967 5/1992
JP 2004239113 8/2004

OTHER PUBLICATIONS

Form PCT/ISA/210, Nov. 9, 2010.

* cited by examiner

*Primary Examiner* — Nicholas Ponomarenko
(74) *Attorney, Agent, or Firm* — Thomas, Kayden, Horstemeyer & Risley, LLP

(57) ABSTRACT

Biasing unit, a spindle member, and a link mechanism of a windmill for a wind power generator vary an angle of a blade in a first stage where the angle is made nearly parallel to the wind so that the blade easily rotates in light winds, a second stage where the angle is made nearly perpendicular to the wind so that the blade easily rotates at high speed when the wind speed increases, and a third stage where the blade is pushed back from the state of being nearly perpendicular to the wind to the state of being nearly parallel to the wind so as to prevent the excessive rotation in strong winds, without electrical control being not required. Accordingly this wind power generator has an excellent starting performance and can control the excessive rotation at low cost.

12 Claims, 20 Drawing Sheets

A-A cross section

A-A cross section

B-B cross section

B-B cross section

M-M cross section (a) FW+FB>FA (b) FW+FB<FA (FW increases, and FA also increases with increase of FW Maximum value)

(c) FW+FB>FA (FW further increases, and FA becomes maximum value)

WINDMILL FOR WIND POWER GENERATOR AND WIND POWER GENERATOR

CROSS REFERENCE TO RELATED APPLICATION

This application is the 35 U.S.C. §371 national stage of PCT application entitled "Windmill for Wind Power Generator and Wind Power Generator," having serial number PCT/JP2010/069962, filed on Nov. 9, 2010. This application also claims priority to and benefit of Japanese Application No. 2010-231793, filed on Oct. 14, 2010, which is incorporated by reference in its entirety.

BACKGROUND OF THE INVENTION

1. Field of the Invention

The invention relates to a windmill for a wind power generator and a wind power generator comprising the windmill.

Recently, for the sake of global environmental protection, as a power generation method using renewable energy, wind power generation free from discharge of greenhouse gases such as carbon dioxide has attracted attention (for example, Patent Document 1).

2. Description of the Related Art

Patent Document

Patent Document 1: Japanese Patent Application Laid-Open Publication No. 2004-239113

SUMMARY OF THE INVENTION

Problems to be Solved by the Invention

However, in the wind power generation, excessive rotational elevation upon increase in wind speed may result in failure and destruction of a windmill, and therefore, means for controlling this is required. For example, there has been disclosed a technique of reducing the speed using a brake and so on. However, in this case, not only a braking mechanism but also a controller which controls the braking mechanism is required, and therefore, the cost problem remains. Further, since a constitution preparing for a power failure is required to be adopted, increased cost cannot be avoided.

Meanwhile, there are problems at the start of the rotation of the windmill whereas upon reaching the excessive rotation. In such a state that the rotation of the windmill is stopped or almost stopped, a torque required for rotating the windmill is large, and therefore, recently, the starting performance is required to be improved. For example, when gear at the start of the rotation is low gear, such a control is performed that the gear is changed to high gear as the rotation is increased, whereby the starting performance is easily improved. However, as in the case where the excessive rotation is controlled, since a gear mechanism, a controller thereof, and a constitution preparing for a power failure are required, the cost problem remains.

An object of the invention is to provide, at low cost, a windmill for a wind power generator for which an electrical control is not required, in which the rotation speed is autonomously controlled according to wind speed, and by which an excellent starting performance can be realized and, at the same time, the excessive rotation can be prevented by virtue of the autonomous rotation speed control; and a wind power generator comprising the windmill.

Means for Solving the Problems

In order to solve the above problems, the invention provides a windmill for a wind power generator which receives wind power to be rotated in a constant rotational direction around a predetermined rotation shaft. The windmill comprises two or more blades, a blade fixing portion, and a blade angle adjustment mechanism. The blades are provided around the rotation shaft so as to be rotated by receiving the wind power from a rotation shaft line direction of the rotation shaft and extends radially outward with respect to the rotation shaft. The blade fixing portion is fixed to the rotation shaft in the form of, when the blade receives the wind power, receiving a pressing force so that a width direction of a wind receiving surface of the blade is nearly parallel to the wind and, at the same time, in the form that the angle formed by the width direction of the wind receiving surface and the rotation shaft line direction of the rotation shaft is variable. The blade angle adjustment mechanism comprises biasing unit and a spindle member. When the wind power is less than a predetermined light wind level, the biasing unit biases and holds the blade, which receives the wind power, at a predetermined angle position for initial rotation where the width direction of the blade is most nearly parallel to the wind. The spindle member is coupled to the blade through a link mechanism so that when the wind power is more than the light wind level, the centrifugal force overcomes the pressing force due to the wind power applied to the blade and the biasing force of the biasing unit, whereby the blade varies to be nearly perpendicular to the wind while the spindle member displaces outward. In the blade angle adjustment mechanism, when the wind power reaches a predetermined strong wind level, the blade is made to reach a predetermined angle position for high speed rotation where the width direction of the blade is most nearly perpendicular to the wind, and when the wind power further exceeds the strong wind level, the pressing force due to the wind power and the biasing force of the biasing unit overcome the centrifugal force to push back the spindle member inward, whereby the blade is returned so that the width direction of the blade is nearly parallel to the wind.

In the invention, the term "the width direction of the wind receiving surface of the blade is nearly parallel to the wind" unit that the blade approaches the side where the angle formed by the width direction of the wind receiving surface of the blade and the wind receiving direction (that is, the shaft line direction of the rotation shaft) is small. The term "the width direction of the wind receiving surface of the blade is nearly perpendicular to the wind" means that the blade approaches the side where the angle formed by the width direction of the wind receiving surface of the blade and a plane perpendicular to the wind receiving direction (that is, a perpendicular plane with respect to the shaft line direction of the rotation shaft) is small.

According to the above constitution of the invention, a change of the angle formed by the width direction of the wind receiving surface of the blade and the rotation shaft line direction of the rotation shaft can be autonomously controlled corresponding to the rotation speed of the blade without using power of an electric machinery such as a motor, and therefore, power generation can be continued safely even in power failure, for example.

Further, according to the above constitution of the invention, unlike such a simple autonomous control that the brake is applied as the rotation speed of the windmill increases to prevent the excessive rotation, the optimum rotating state corresponding to the wind power can be obtained. Namely, there are the following first to third stages. In the first stage (low gear stage), the width direction of the wind receiving surface of the blade is nearly parallel to the wind so that the windmill easily rotates when the wind power is at the light wind level, and the blade is in a high torque and low speed rotating state. In the second stage (top gear stage), the wind power increases from the first stage to displace the spindle member outward by the centrifugal force, whereby the width direction of the wind receiving surface of the blade is nearly perpendicular to the wind against the biasing force of the biasing unit through a link member, and the blade is in a low torque and high speed rotating state. In the third stage, the wind power further increases, so that the wind pressure applied to each blade overcomes the centrifugal force of the spindle member, and the wind power pushes back a weight member to some extent, whereby the width direction of the wind receiving surface of the blade is returned to be nearly parallel to the wind. According to this constitution, in the light winds at the first stage, the accelerated rotation performance is high. At the second stage from light winds to strong winds, the blade is changed to a state of rotating more easily and allowing the rotation speed to be further increased. At the third stage where the wind level exceeds a predetermined strong wind level, the excessive rotation of the blade can be suppressed according to the wind volume. In the third stage, the force of making the width direction of the wind receiving surface of the blade nearly perpendicular to the wind by the centrifugal force applied to the weight member and the force of making the width direction of the wind receiving surface of the blade nearly parallel to the wind by the wind power are counterbalanced each other, and the angle formed by the width direction of the wind receiving surface of the blade and the rotation shaft line direction of the rotation shaft is automatically determined by the balance.

The blade fixing portion in the invention is a hinge member having a rotation pivot extending in an extending direction of the blade and two fixing portions in which the angle formed by them is variable around a shaft line of the rotation pivot. The blade fixing portion can be configured so that one of the fixing portions is fixed to the blade, and the other is integrally rotatably fixed to the rotation shaft side. In this case, it is preferable that the rotation pivot is provided on a first end side of the blade so that a second end side as the other end side of the blade rotates around the first end side in the width direction of the blade. In the invention, the force considered to change the width direction of the blade to be nearly parallel or perpendicular to the wind includes the wind power received by the wind receiving surface of the blade. When the rotation pivot is not provided disproportionately at one end in the width direction of the blade, the wind power received on the one end side and the wind power received on the other end side offset each other with respect to the rotation pivot, and therefore, a lot of waste is generated. However, the rotation pivot is provided on the end side, whereby the waste can be eliminated.

The spindle member in the invention may be link-coupled toward the end on the outer peripheral side in the width direction of the blade. Consequently, the blade fixing portion can be easily moved by the spindle member.

The spindle member in the invention is provided for each of a plurality of the blades, and the respective spindle members are provided integrally rotatably with the rotation shaft. On the other hand, the spindle members are coupled to a common connecting member through a link mechanism so as to slide and move with respect to the rotation shaft according to inward and outward displacement, whereby such a constitution can be realized that the angle of each blade is changed so as to be in synchronism with each other to have the same angle according to a position on the rotation shaft of a coupling member sliding and moving with the inward and outward movement of the spindle members. According to this constitution, since the angle formed by the width direction of the wind receiving surface of all the blades and the rotation shaft line direction of the rotation shaft is determined by a slide displacement direction and a slide displacement amount of an annular coupling member, rotation balance of the plurality of blades can be achieved.

Each of the blade fixing portions in the invention is fixed to the rotation shaft through a common fixing member fixed integrally rotatably with the rotation shaft, and the biasing unit can be provided so that the biasing force is generated in the rotation shaft line direction between the fixing member and the coupling member. According to this constitution, when such a constitution is provided that the biasing unit applies the biasing force to the individual blades, the biasing force applied to each blade may be biased; however, if the respective blades are fixed to the common fixing member, and the fixing member has the biasing unit, the common biasing force can be applied to the respective blades; therefore, the angles of the respective blades can be integrated.

In the blade angle adjustment mechanism in the invention, when the wind power is less than the light wind level, while the blade receiving the wind power is biased by the biasing unit so that the width direction of the blade is nearly parallel to the wind, an abutting member is abutted against a movable structure including the blade and operated in response to the change of the angle of the blade, and the operation is stopped, whereby the blade is held at the initial rotation angle position. Meanwhile, when the wind power further exceeds the strong wind level, the blade can be returned to the initial rotation angle position where the movable structure is abutted against the abutting member. According to this constitution, since the rotation limit position of the blade on the side nearly parallel to the wind is physically determined by the abutting member, there is no need to worry that the initial rotation angle position is deviated. In this case, if at least one of the abutting member and the abutting surface of the movable structure has an elastic member, the impact upon abutting is absorbed, and the life of the windmill can be extended.

In the above invention, when both the coupling member and the fixing member are provided, each blade fixing portion is fixed to the rotation shaft through the common fixing member fixed integrally rotatably with the rotation shaft and functions as the above abutting member. Meanwhile, the coupling member is connected to the link mechanism so as to approach the fixing member as the width direction of the blade is nearly parallel to the wind, and functions as the above structure. Any one or both of the fixing member and the coupling member have an extending portion extending toward the other member. The front end of the extending portion on the other member side is abutted against the other member, whereby the blade can be held at the initial rotation angle position. Instead of providing the abutting member with respect to each blade, the coupling member or the fixing member has the abutting member, whereby it becomes easy to determine the common initial rotation angle position of all the blades.

In the wind power generation, since power generation output is varied in accordance with variation of the wind speed, there is a problem that it is unstable, and the wind power generator which can further stabilize the unstable power generation output in the wind power generation is required to be provided.

Meanwhile, the wind power generator in the invention comprises the windmill of the invention having the above constitution, a flywheel, and power generation unit. The flywheel is coaxial with the rotation shaft and arranged through a one-way clutch so that when the rotation shaft increases its speed in a constant rotational direction, the flywheel is in a state of rotating integrally with the rotation shaft and rotates with increased speed, and when the rotation shaft reduces its speed, the flywheel is separated from the rotation shaft to rotate inertially. The power generation unit has a rotor arranged so as to be coaxial with the flywheel and rotate integrally with the flywheel and generates electric power by the rotation of the rotor with the rotation of the flywheel.

According to the above constitution of the wind power generator of the invention, since the electric power generated by the power generation unit is generated based on a stable rotational energy stored in the flywheel, the output is stable, and therefore, relatively stable power generation output can be obtained.

When the speed of the windmill is reduced, the flywheel and the rotation shaft of the windmill are separated from each other, and therefore, the flywheel is in an inertial rotation state. Namely, since speed reduction factors on the flywheel side are significantly reduced, the rotation can be continued for a longer time. Meantime, although smooth attenuation occurs over time, stable power generation output can be obtained from the power generation unit.

When the windmill increases its speed, the rotation shaft of the windmill and the flywheel are in an integrally rotating state, and the rotational energy is stored in the flywheel. Therefore, even if the windmill reduces its speed after that, by virtue of the rotational energy stored when the speed increases, stable power generation output can be continuously obtained from the power generation unit for longer periods of time, corresponding to the stored rotational energy.

Since the spindle member stores the rotational energy as in the fly wheel, the rotation can be continued for a longer time.

In the wind power generator in the invention, when the power generation unit is second power generation unit, the wind power generator can be configured to comprise first power generation unit. The first power generation unit has a rotor arranged so as to be coaxial with the rotation shaft of the windmill and rotate integrally with the rotation shaft and is different from the second power generation unit and generates electric power by the rotation of the rotor with the rotation of the rotation shaft. The wind power generator further comprises the output unit that externally outputs both or any one of the electric powers generated by the first power generation unit and the second power generation unit.

According to the above constitution of the wind power generator in the invention, although the electric power generated by the first power generation unit is significantly varied according to the wind power received by the windmill, the electric power generated by the second power generation unit is generated based on the stable rotational energy stored in the flywheel, and therefore, the output is stable. For example, when the electric powers generated by the first and second power generation unit are superimposed and output, the instability of the electric power generated by the first power generation unit is mitigated, and relatively stable power generation output can be generally obtained.

PREFERRED EMBODIMENT FOR CARRYING OUT THE INVENTION

Hereinafter, one embodiment of a windmill for a wind power generator of the invention and a wind power generator using the windmill will be described with reference to the drawings.

Figure 1:
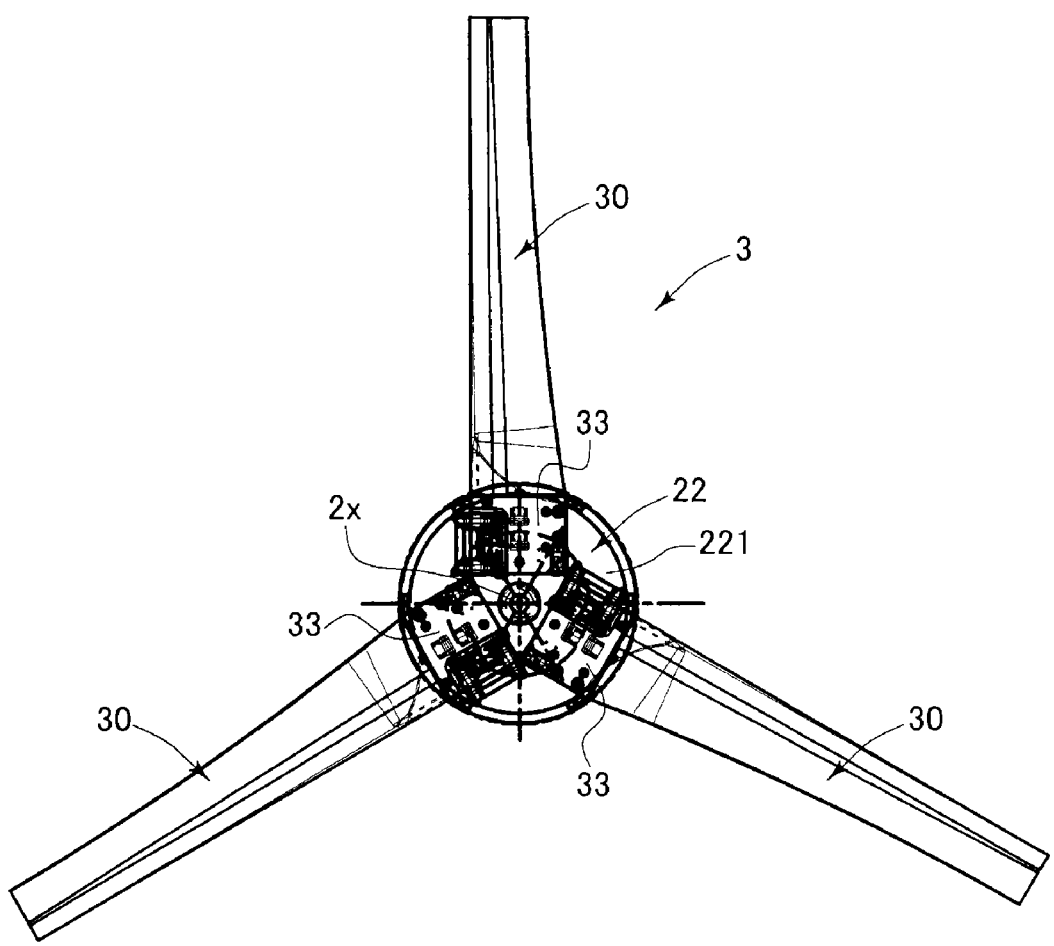
FIG. 1 is a back side view of blades and a hub in a wind power generator as one embodiment of the invention.

FIG. 1 is a back side view of blades and a hub of a wind power generator of the present embodiment, and FIG. 2A~2E are a partial enlarged views thereof.

Figure 3:
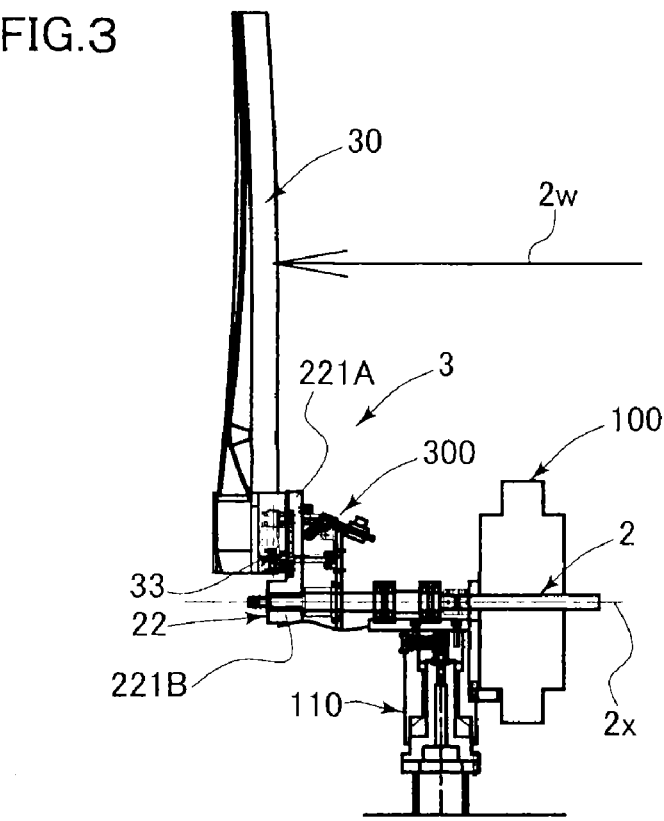
FIG. 3 is a partial cross-sectional view of the wind power generator having a windmill of FIG. 1 and shows a state in which a spindle member is located inward in the radial direction.
Figure 4:
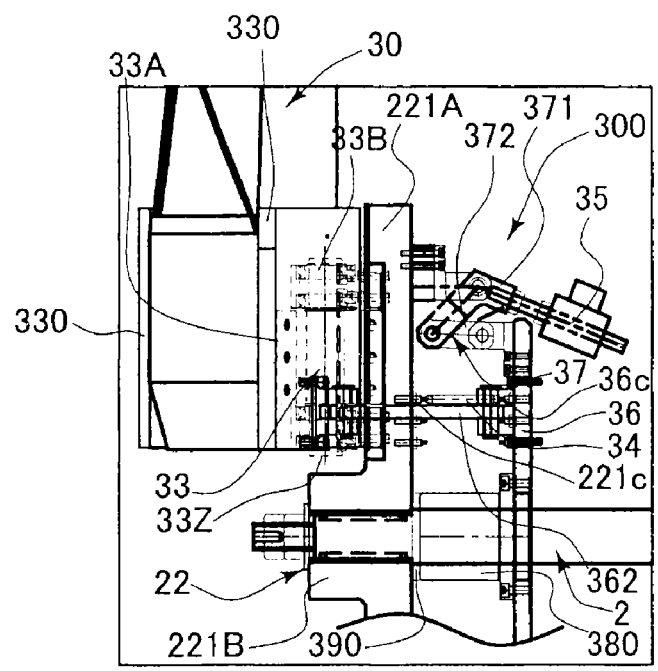
FIG. 4 is a partial enlarged view of FIG. 3.

FIG. 3 is a partial cross-sectional view of the wind power generator of the present embodiment having a windmill 3 of FIG. 1, and FIG. 4 is a partial enlarged view thereof. In FIGS.

Figure 5:
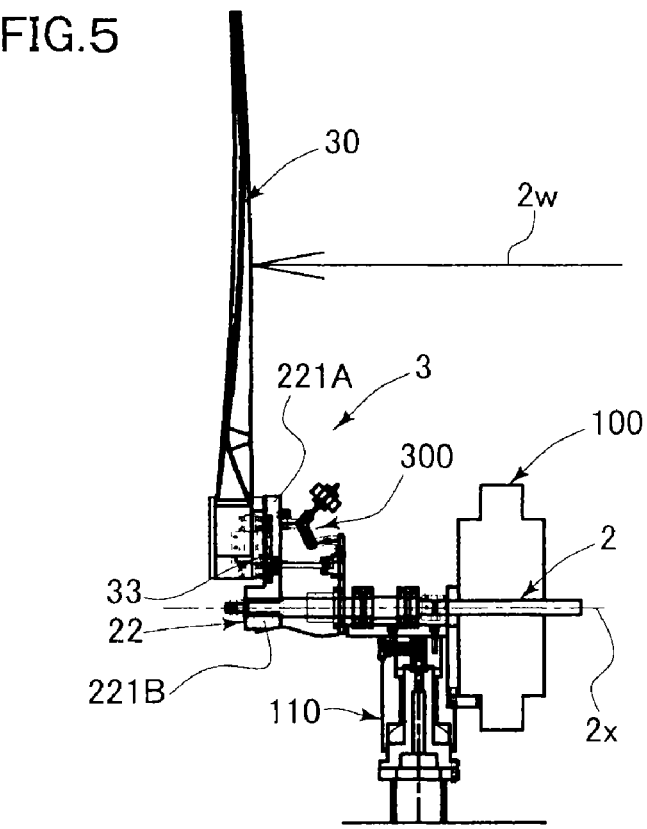
FIG. 5 is a partial cross-sectional view of the wind power generator having the windmill of FIG. 1 and shows a state in which the spindle member is located outward in the radial direction.
Figure 6:
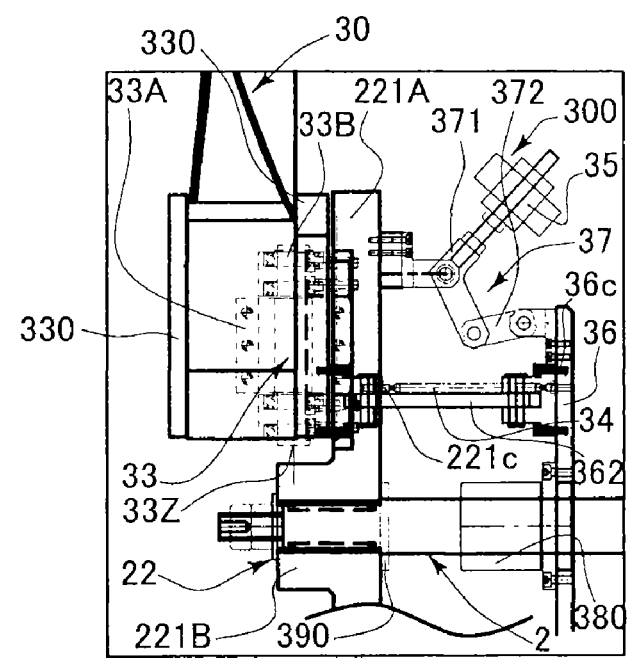
FIG. 6 is a partial enlarged view of FIG. 5.

3 and 4, a spindle member 35 to be described later is located inward. FIG. 5 is a partial cross-sectional view of the wind power generator of the present embodiment having the windmill of FIG. 1, and FIG. 6 is a partial enlarged view thereof. In FIGS. 5 and 6, the spindle member to be described later is located outward.

Figure 13:
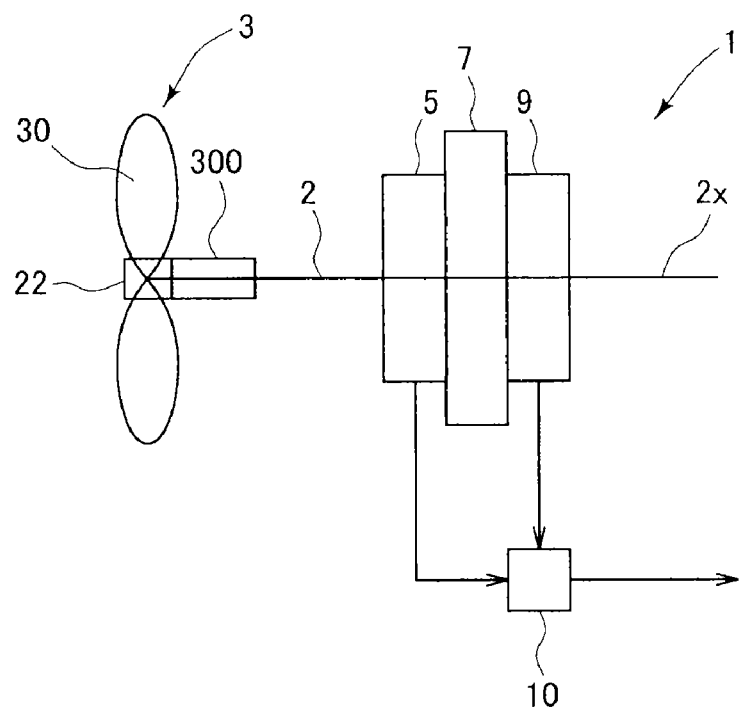
FIG. 13 is a block diagram showing an electrical configuration of the wind power generator of FIG. 12 in a simplified manner.

The windmill 3 of the wind power generator 1 of the present embodiment shown in FIG. 1 receives wind to be rotated in a constant rotational direction around a predetermined rotation shaft 2. The windmill 3 is configured to comprise two or more blades 30 provided around the rotation shaft 2, blade fixing portions 33 to fix the blade 30 to the rotation shaft 2 so that an angle θ formed by a width direction W of a wind receiving surface 30w (see FIG. 11) of the blade 30 and a direction of a rotation shaft line 2x of the rotation shaft 2 is variable, and an angle adjustment mechanism 300 (see FIGS. 13 and 5) having first to third stages corresponding to the wind power and adjusts the angle θ of the blade 30 so that the angle θ is autonomously varied corresponding to wind power in a stepwise manner in each of the stage. In the first stage (rotation start stage), the angle θ of the blade 30 is a predetermined angle position A for initial rotation where when the wind power is less than a predetermined light wind level, the blade 30 is most nearly parallel to the wind (near the wind parallel direction X: near the wind receiving direction 2w), so that the blade 30 is easily accelerated and rotated. In the second stage (high rotation stage), when the wind power is more than the predetermined light wind level, the blade 30 is varied to be nearly perpendicular to the wind (near the wind perpendicular surface Y), so that the blade 30 is easily rotated at a higher speed. In the third stage (excessive rotation prevention stage), when the wind power is more than a predetermined strong wind level, the blade 30 is pushed back from the state of being nearly perpendicular to the wind to the state of being nearly parallel to the wind in order to prevent the excessive rotation of the blade 30.

In the windmill 3 of the present embodiment, as shown in FIGS. 3 and 5, the wind receiving direction 2w coincides with the direction of the rotation shaft line 2x of the rotation shaft 2. The windmill 3 is configured to comprise a plurality of the blades 30 arranged so as to receive the wind power from the wind receiving direction 2w and thereby rotate in a constant direction and a hub 22 integrally rotatably coupling (connecting) the blades 30 with the rotation shaft 2.

The blade 30 is arranged so that the wind receiving surface 30w (see FIG. 11) intersects with the wind receiving direction 2w and rotated by receiving the wind power from the direction of the rotation shaft line 2x of the rotation shaft 2. The two or more blades 30 (herein three blades 30 are provided at regular intervals) are provided at predetermined intervals around the rotation shaft line 2x. Each of the blades 30 extends radially outward with respect to the rotation shaft 2.

As shown in FIGS. 4 and 6, the hub 22 has a shaft fixing portion (fixing member) 221, which is fixed to the rotation shaft 2 so as to rotate integrally with the rotation shaft 2, and blade fixing portions (blade fixing portions) 33 fixing the respective blades 30 to the shaft fixing portion 221. According to this constitution, the respective blades 30 are fixed to the shaft fixing portion 221 (see FIGS. 1 and 2) by the corresponding blade fixing portions 33 and rotate integrally with the rotation shaft 2.

As shown in FIGS. 4 and 6, the shaft fixing portion 221 has such a shape that has an annular disk-shaped forward end 221A and a tubular rear end 221B in which the center of the forward end 221A extends toward the downstream side of the rotation shaft 2 in the wind receiving direction. The rotation shaft 2 is inserted into the shaft fixing portion 221 from the upstream side in the wind receiving direction, and the rotation shaft 2 and the shaft fixing portion 221 are fixed by a fastening member so as to rotate integrally with each other.

As shown in FIGS. 4 and 6, each of the blades 30 has the blade fixing portion 33. The blade fixing portions 33 are fixed to the common shaft fixing portion (fixing member) 221 in the form of receiving a pressing force FW (see FIG. 11) so that when the corresponding blade 30 receives the wind power, the width direction W of the wind receiving surface 30w of the blade 30 is nearly parallel to the wind and, at the same time, in the form that the angle θ formed by the width direction W and the direction of the rotation shaft line 2x is variable. According to this constitution, the respective blade fixing portions 33 are integrally fixed to the rotation shaft 2 through the common shaft fixing portion (fixing member) 221 fixed to the rotation shaft 2 so as to rotate integrally with the rotation shaft 2.

The blade fixing portion 33 of the present embodiment is a hinge member having a rotation pivot 33Z extending in an extending direction of the blade 30 and two paired fixing portions 33A and 33B in which the angle formed by them is variable around a shaft line 33z (see FIGS. 2A~2E) of the rotation pivot 33Z. The fixing portion 33A is integrally fixed to the blade 30 by a fastening member through a blade attachment member 330. The fixing portion 33B is integrally fixed to the shaft fixing portion 221 on the rotation shaft 2 side by the fastening member as with the fixing portion 33A, whereby the entire blade fixing portion 33 can be rotated integrally with the shaft fixing portion 221.

Figure 2A:
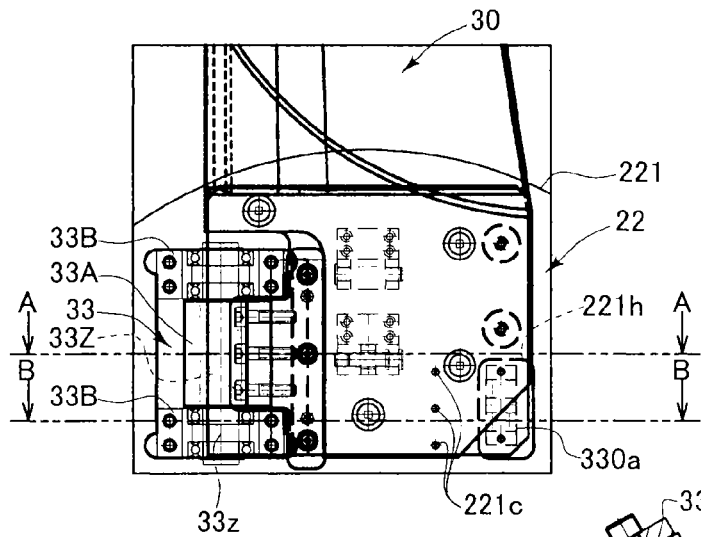
FIG. 2A is a partial enlarged plan view of FIG. 1.
Figure 2B:
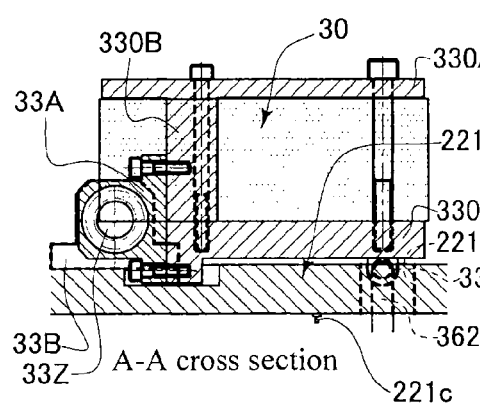
FIG. 2B is a A-A cross-sectional view of FIG. 2A
Figure 2D:
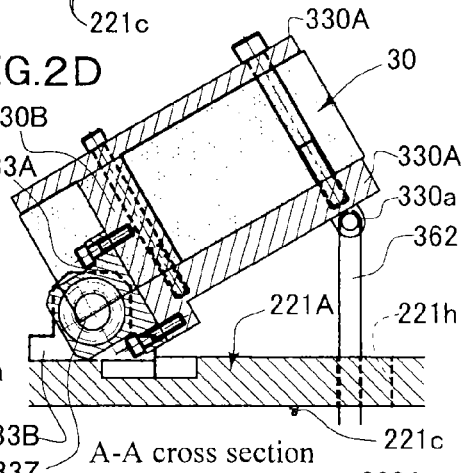
FIG. 2D is a functional view of FIG. 2B
Figure 2C:
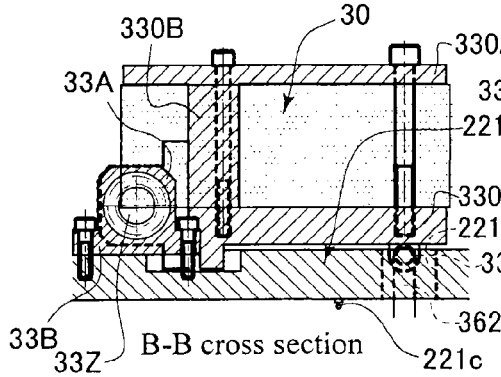
FIG. 2C is a B-B cross-sectional view of FIG. 2A
Figure 2E:
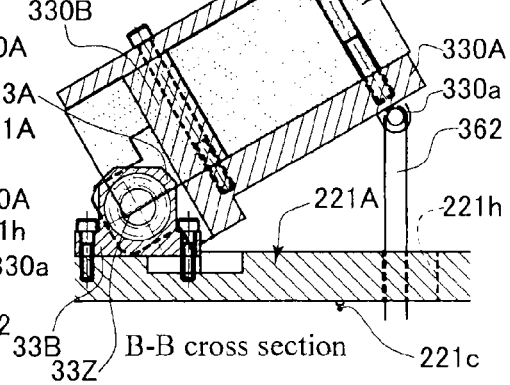
FIG. 2E is a functional view of FIG. 2C

As shown in FIG. 2A~2E, the blade attachment member 330 of the present embodiment is configured to have paired parallel plate portions 330A, 330A for holding the blade 30 therebetween and a perpendicular binding portion 330B which binds the parallel plate portions 330A so as to be perpendicular to the parallel plate portions 330A. The blade 30 held between the parallel plate portions 330A, 330A is integrally fixed by a fastening member. FIG. 2A is an enlarged partial cross-sectional view of one plate fixing portion of FIG. 1. FIGS. 2B and 2D are schematic views showing an A-A cross section of FIG. 2A in a simplified manner. FIGS. 2C and 2E are schematic views showing a B-B cross section of FIG. 2A in a simplified manner. However, FIGS. 2D and 2E are different from FIGS. 2B and 2C in the angle θ formed by the width direction W of the blade 30 and the direction of the rotation shaft line 2x. FIGS. 2B and 2C show a state in which the blade 30 is nearly perpendicular to the wind. FIGS. 2D and 2E show a state in which the blade 30 is nearly parallel to the wind. In FIG. 2A~2E, the fixing portion 33A of the blade fixing portion 33 is fastened and fixed to the perpendicular binding portion 330B. The blade 30 can be rotated around the shaft line 33z of the rotation pivot 33Z along with the parallel plate portions 330A, 330A. Meanwhile, the fixing portion 33B of the blade fixing portion 33 is fixed directly to the shaft fixing portion 221 by a fastening member.

Figure 8:
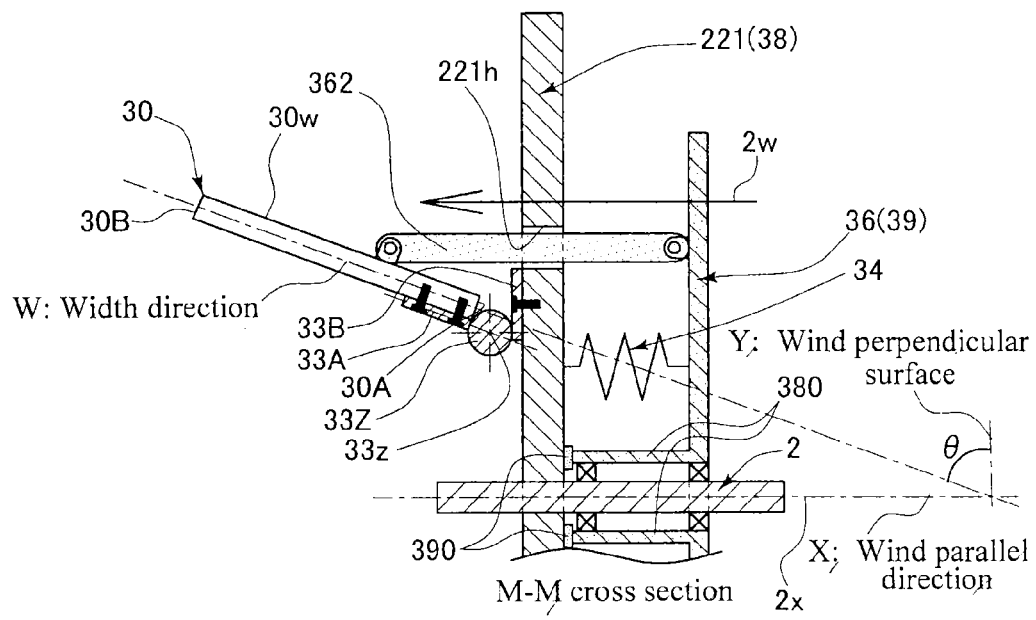
FIG. 8 is a schematic view showing a state of FIG. 4 in plan view in a simplified manner.
Figure 10:
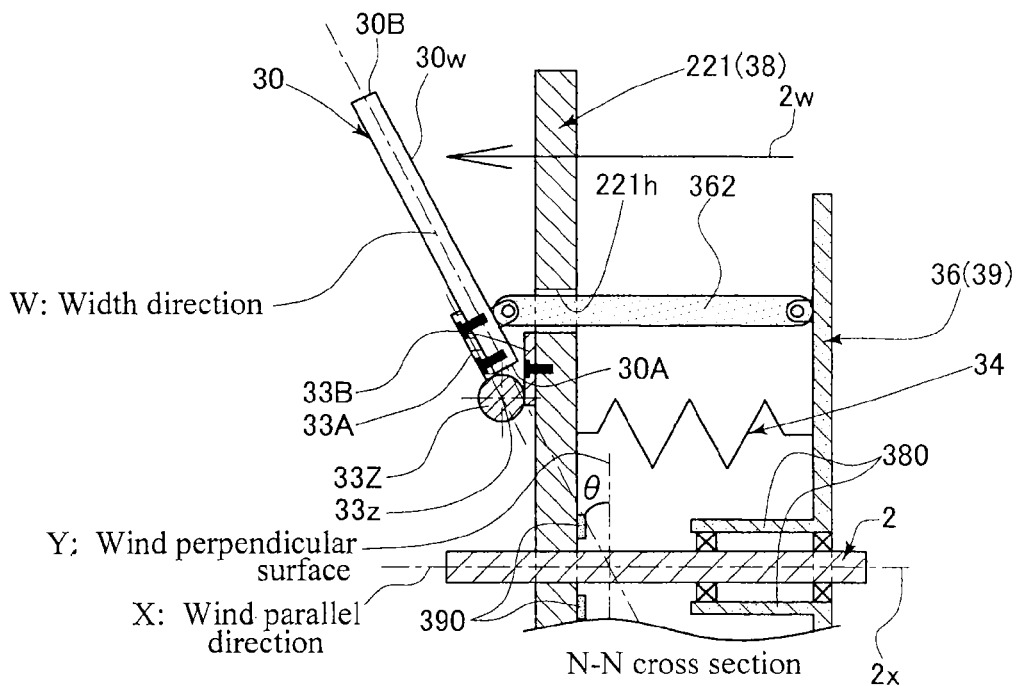
FIG. 10 is a schematic view showing a state of FIG. 6 in plan view in a simplified manner.

As shown in FIGS. 8 and 10, the rotation pivot 33Z is provided at a biased position displaced to a first end 30A side of the blade 30 so that a second end 30B side is rotated around the first end 30A side in the width direction W. In the present embodiment, the first end 30A is the inner peripheral side with respect to the shaft line 33z, and the second end 30B is the outer peripheral side with respect to the shaft line 33z. In the rotation pivot 33Z of the present embodiment, the shaft line 33z is located more outside than an edge position on the first end 30A side.

Figure 11:
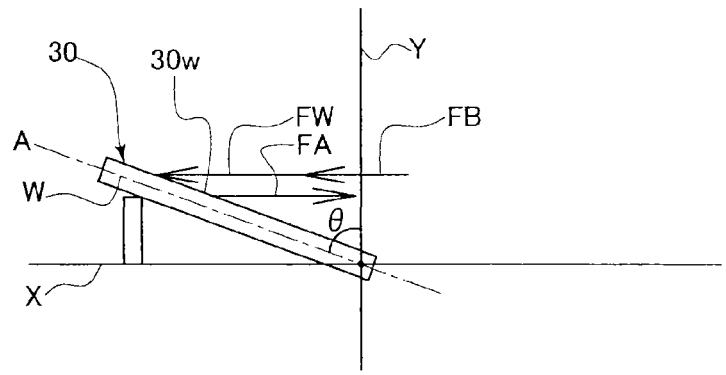
FIG. 11 is a schematic view for explaining in a simplified manner a rotation operation of the blade in the embodiment of FIG. 1.
Figure 11:
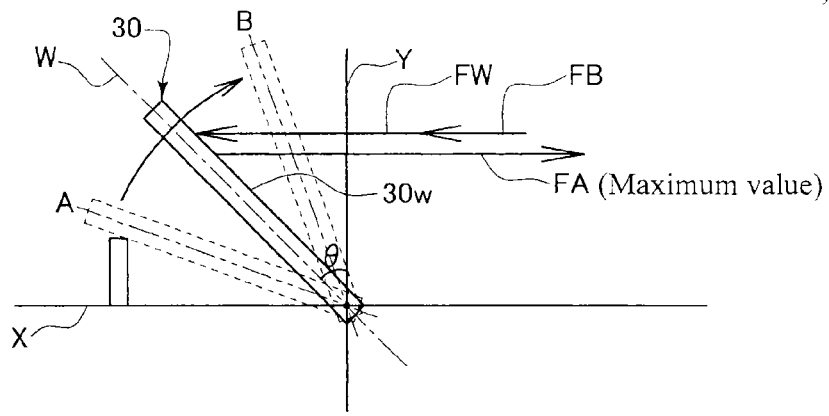
Figure 11:
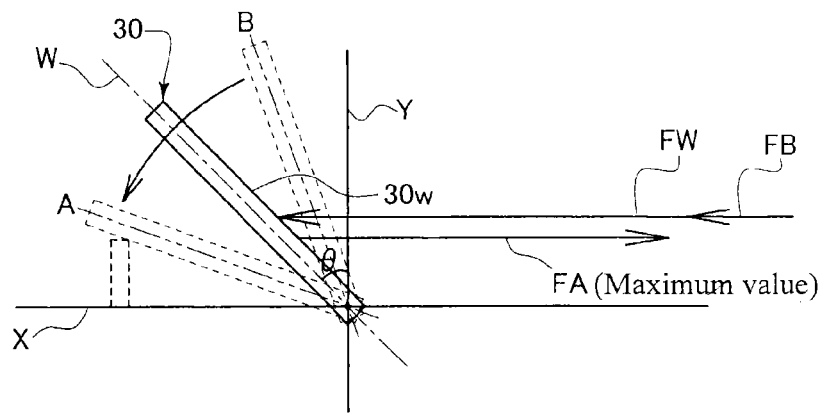

As shown in FIG. 11, the angle adjustment mechanism 300 comprises biasing unit 34 (see FIGS. 4 and 6) and the spindle member 35 (see FIGS. 4 and 6). When the wind power is less than a predetermined light wind level, the biasing unit 34 biases and holds the blade 30 receiving the wind power to the predetermined initial rotation angle position A where the width direction W is most nearly parallel to the wind (near the wind parallel direction X). The spindle member 35 is coupled to the blade 30 through a link mechanism 37 (see FIGS. 4 and 6) so that when the wind power is more than the light wind level, a centrifugal force FA overcomes a pressing force FW that is applied to the wind receiving surface 30$w$ due to the wind power applied to the blade 30 and a biasing force FB of the biasing unit 34, whereby the blade 30 is varied to be nearly perpendicular to the wind (near the wind perpendicular surface Y) while the spindle member 35 displaces outward. When the wind power reaches the predetermined strong wind level, the blade 30 is made to reach a predetermined angle position B for high speed rotation where the width direction W is most nearly perpendicular to the wind. When the wind power further exceeds the strong wind level, the pressing force FW due to the wind power and the biasing force FB of the biasing unit 34 overcomes the centrifugal force FA to push back the spindle member 35 inward, whereby the blade 30 is returned so that the width direction W of the blade 30 is nearly parallel to the wind.

In the invention, the term "the width direction W of the wind receiving surface 30$w$ of the blade 30 is nearly parallel to the wind" means that the blade 30 approaches the side where the angle θ formed by the width direction W of the wind receiving surface 30$w$ of the blade 30 and the wind receiving direction 2$w$ (that is, the direction of the rotation shaft line 2$x$ of the rotation shaft 2, that is the wind parallel direction X) is small. The term "the width direction W of the wind receiving surface 30$w$ of the blade 30 is nearly perpendicular to the wind" means that the blade 30 approaches the side where the angle formed by the width direction W of the wind receiving surface 30$w$ of the blade 30 and a surface Y perpendicular to the wind receiving direction 2$w$ (that is, a perpendicular plane Y with respect to the direction of the rotation shaft line 2$x$ of the rotation shaft 2) is small.

Hereinafter, the configuration of the angle adjustment mechanism 300 of the present embodiment will be described using FIGS. 7 to 10. The angle adjustment mechanism 300 of the invention is not limited to the following configuration of the present embedment.

Figure 7:
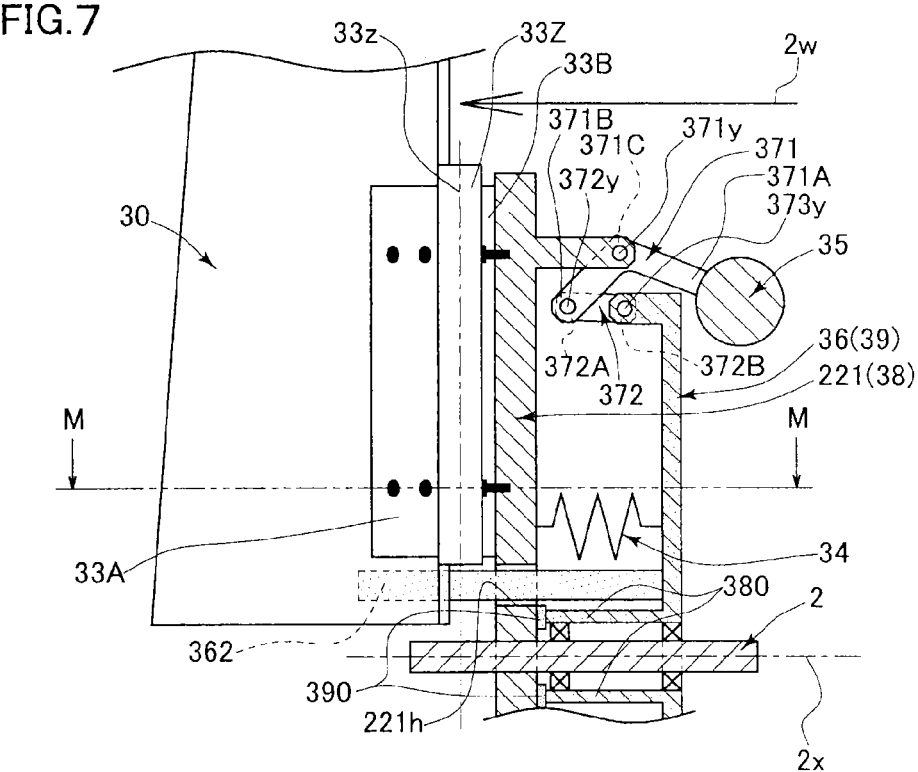
FIG. 7 is a schematic view showing the state of FIG. 4 in a simplified manner.
Figure 9:
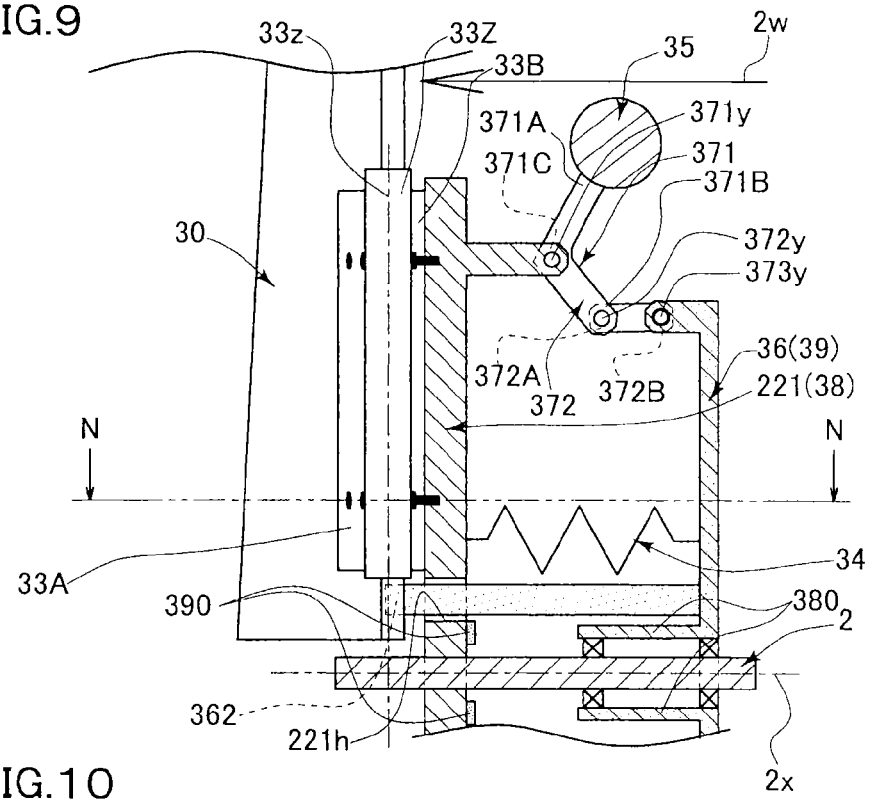
FIG. 9 is a schematic view showing the state of FIG. 6 in a simplified manner.

The blades 30 each have the spindle member 35. As shown in FIGS. 7 and 9, the respective spindle members 35 are attached so as to be rotated integrally with the rotation shaft 2. The spindle members 35 are provided rotatably and integrally with the rotation shaft 2 or in cooperation with the rotation shaft 2 through the link mechanism 37 (see FIGS. 4 and 6) so as to be rotated with the rotation of the rotation shaft 2 and can displace radially inward and outward with respect to the rotation shaft line 2$x$ in response to the centrifugal force applied to the spindle members 35. In the present embodiment, the spindle member 35 is coupled and fixed to the shaft fixing portion 221 so as to be rotatable around a rotation shaft line 371$y$ perpendicular to both the radial direction (the radial direction to which the corresponding spindle member 35 displaces) and the rotation shaft line 2$x$. Meanwhile, the spindle member 35 is connected to a common coupling member 36 through the link mechanism 37, whereby the coupling member 36 is provided so as to slide and move on the rotation shaft 2 in response to the inward and outward radial displacement of the spindle member 35.

The link mechanism 37 can be moved by the centrifugal force FA that is applied more widely as the rotation speed of the rotation shaft 2 becomes larger. The link mechanism 37 displaces the spindle member 35 within a previously determined radial range so that as the centrifugal force FA becomes larger, the spindle member 35 is located more outward and as the centrifugal force FA becomes smaller, the spindle member 35 is located more inward. In the present embodiment, as shown in FIGS. 7 and 9, the link mechanism 37 is configured to have a first link member 371 and a second link member 372 link-connected to each other. In the first link member 371 formed into an L shape, the spindle member 35 is integrally fixed to one end 371A by a fastening member, and one end 372A of the second link member 372 is attached to the other end 371B so as to be rotatable each other in the form of having a rotation shaft line 372$y$ perpendicular to both the rotation shaft line 2$x$ and its radial direction (the radial direction to which the corresponding spindle member 35 displaces). The other end 372B of the second link member 372 is attached to the outer peripheral portion of the annular disk-shaped coupling member 36 so as to be rotatable each other in the form of having a rotation shaft line 373$y$ parallel to the rotation shaft line 372$y$. Further, the end 372B is attached to a bending portion 371C, which is located at an intermediate portion of the L-shaped first link member 371, so as to be rotatable with respect to the shaft fixing portion 221 in the form of having the rotation shaft line 371$y$ parallel to the rotation shaft line 372$y$. The shaft fixing portion 221 is integrally fixed to the rotation shaft 2 and does not displace with the radial movement of the spindle member 35, and the first link member 371 and the second link member 372 can move so that the shaft fixing portion 221 serves as a fixing link.

The biasing unit 34 is a spring member (tension spring), and the blades 30 each have the biasing unit 34. In the biasing unit 34, as shown in FIGS. 7 and 9, one end is fixed on the opposite surface side of the blade fixing portion 33 in the shaft fixing portion 221, and the other end is fixed on the facing surface side of the facing coupling member 36 in the direction of the rotation shaft line 2$x$. In the present embodiment, a spring fixing portion 221$c$ (see FIG. 2A) fixing one end of the spring member 34 is provided on the surface on the upstream side in the wind receiving direction of the shaft fixing portion 221, and a spring fixing portion 36$c$ (see FIGS. 4 and 6) fixing the other end of the spring member 34 is provided on the surface on the downstream side in the wind receiving direction of the coupling member 36. Pairs of the spring fixing portions 221$c$ and 36$c$ are previously provided at a plurality of positions (herein three positions), whereby the biasing force can be adjusted by increasing the number of the spring members 34.

The coupling member 36 can be rotated integrally with respect to the rotation shaft 2 through the link mechanism 37 and the shaft fixing portion 221 and is coupled to the rotation shaft 2 through a bearing device at the central portion so as to slide and move on a first side of the rotation shaft line 2$x$ by the radial inward displacement of the spindle member 35 (see FIGS. 7 and 8) and slide and move on a second side of the rotation shaft line 2$x$ by the radial outward displacement of the spindle member 35 (see FIGS. 9 and 10). In the present embodiment, the first side is the downstream side in the wind receiving direction (the shaft fixing portion 221 side), and the second side is the upstream side in the wind receiving direction.

In the coupling member 36, the blades 30 each have a pressing member 362 which presses directly or indirectly the corresponding blade 30 so that the angle θ is nearly parallel to the wind by the slide movement toward the first side of the rotation shaft line 2$x$ by the radial inward displacement of the spindle member 35, and pulls back directly or indirectly the corresponding blade 30 so that the angle θ is nearly perpendicular to the wind by the slide movement toward the second side of the rotation shaft line 2x by the radial outward displacement of the spindle member 35. According to this constitution, the angle θ of each of the blades 30 is determined corresponding to the position on the rotation shaft of the coupling member 36 which slides and moves with the radial inward and outward movement of the spindle member 35, whereby the angles θ of the blades 30 are changed so as to be synchronized with each other and become the same angle.

The respective pressing members 362 illustrated in FIGS. 7 to 10 have a constitution that the corresponding blade 30 is directly pressed or pulled back. However, in fact, as shown in FIG. 2A~2E, the pressing member 362 extends so as to penetrate through a through-hole 221h formed in the disk-shaped front end 221A of the shaft fixing portion 221, and the extending front end is fixed to a fixing portion 33A, which is integrally fixed to the corresponding blade 30 (a rotation fixing portion 330a of the parallel plate portion 330A on the upstream side in the wind receiving direction), so as to be turnable around a shaft line parallel to the shaft line 33z of the rotation pivot 33Z. The pressing member 362 in the present embodiment is turnably fixed to the second side far away from the rotation pivot 33Z of the fixing portion 33A.

In the spindle member 35, the movable range in the radial direction is previously specified. FIG. 9 shows a state in which the spindle member 35 is at the outermost position in the radial direction, and because of the configuration of the link mechanism 37, the spindle member 35 cannot displace outward radially any more. When the spindle member 35 reaches the outermost position, the blade 30 reaches the predetermined high speed rotation angle position B where the width direction W of the wind receiving surface 30w is most nearly perpendicular to the wind (see FIG. 11). Meanwhile, FIG. 7 shows a state in which the spindle member 35 is at the innermost position in the radial direction, and the spindle member 35 cannot displace inward radially any more. However, it is not the innermost position specified by the configuration of the link mechanism 37. Namely, the innermost position is specified as an abutting position where the movable structure that includes the blade 30 and operates in cooperation with the angle change operation of making the blade 30 nearly parallel to the wind is abutted against the abutting member 38 provided at a position facing the operating direction of the movable structure. In the state of FIGS. 7, 8, and 11A, although the blade 30 is biased to be nearly parallel to the wind by the pressing force FW due to the wind power and the biasing force WB from the biasing unit 34, the angle change operation of making the blade 30 nearly parallel to the wind by the forces FW and FB is stopped when the abutting member 38 is abutted against the movable structure that includes the blade 30 and operates in cooperation with the angle change operation of the blade 30. The stop position is the innermost position in the radial direction of the spindle member 35, and the position of the blade 30 at that time is the initial rotation angle position A.

In the present embodiment, the blade fixing portions 33 are fixed to the rotation shaft 2 through the common fixing member integrally rotatably fixed to the rotation shaft 2, and the fixing member functions as the abutting member 38. In the present embodiment, the shaft fixing portion 221 is the abutting member 38. Meanwhile, the coupling member 36 is connected to the link mechanism 37 so that the coupling member 36 approaches the fixing member as the width direction W of the blade 30 becomes nearly parallel to the wind and functions as the above-described movable structure 39. Any one or both of the shaft fixing portion 221 as the abutting member 38 and the coupling member 36 as the movable structure 39 have an extending portion 380 extending toward the other member. The front end of the extending portion 380 on the other member side is abutted against an abutting portion 390 of the other member, whereby the blade 30 is held at the initial rotation angle position A. In the present embodiment, the coupling member 36 has, as the extending portion 380, a tubular portion or a protrusion extending from the central portion toward the shaft fixing portion 221, and the front end of the extending portion 380 is abutted against the abutting portion 390 of the shaft fixing portion 221, whereby the blade 30 is held at the initial rotation angle position A. At least one of the abutting portion of the abutting member 38 and the abutting portion of the movable structure 39 is provided as an elastic member formed of rubber or the like. In the present embodiment, the abutting portion 390 of the shaft fixing portion 221 is provided as the elastic member.

According to the above constitution, the blade is operated as the form shown in FIG. 11.

Namely, when the wind power is less than the predetermined slight wind level, as shown in FIG. 11A, the pressing force FW from the wind power applied to the wind receiving surface 30w of the blade 30 and the biasing force FB of the biasing unit 34 overcome the centrifugal force FA to push the spindle member 35 inward, and, thus, to bias and hold the blade 30 at the initial rotation angle position A. Specifically, when the wind power is less than the predetermined light wind level, the spindle member 35 is pushed by the pressing force FW and the biasing force FB so that the movable structure 39 is abutted against the abutting member 38, and the blade 30 is held at the initial rotation angle position A that is the abutting position. At that time, the width direction of the wind receiving surface of the blade 30 is most nearly parallel to the wind. In such a state, the windmill 3 easily obtains high torque even from the slight wind power and easily rotates; however, a high rotation number cannot be easily obtained.

When the wind power is more than the light wind level and reaches the predetermined strong wind level, the centrifugal force FA starts to increase and overcomes the pressing force FW applied to the wind receiving surface 30w and the biasing force FB of the biasing unit 34, and the spindle member 35 displaces outward to a position where FA and, FW plus FB are counterbalanced. At the same time, the angle θ of the blade 30 is separated from the initial rotation angle position A, and the position of the blade 30 is changed to be nearly perpendicular to the wind. In this state, as the blade is nearly perpendicular to the wind, a high torque cannot be easily obtained; however, the windmill 3 is in the middle of transferring to a state more suitable to high speed rotation.

However, the outermost position of the spindle member 35 is specified. When the spindle member 35 reaches the outermost position, the spindle member 35 does not displace outward any more. At that time, the blade 30 is in a state of reaching the predetermined high rotation angle position B where the width direction W of the blade 30 is most nearly perpendicular to the wind. In this state, the windmill 3 can rotate at the highest speed.

When the wind power further exceeds the strong wind level, the pressing force FW from the wind power applied to the wind receiving surface 30w and the biasing force FB of the biasing unit 34 overcome the centrifugal force FA to push back the spindle member 35 inward, whereby the blade 30 is returned so that the width direction W is nearly parallel to the wind. In this state, the windmill 3 is in the middle of gradually transferring to a state in which the high rotation number cannot be easily obtained. The blade 30 in this case can be returned to the initial rotation angle position A where the movable structure 39 is abutted against the abutting member 38.

As described above, according to the present embodiment, the biasing unit 34, the spindle member 35, and the link mechanism 37 are provided, whereby the angle θ of the blade 30 can be varied in the three stages including the first stage in which the angle θ of the blade 30 is nearly parallel to the wind so that the blade 30 easily rotates in light winds, the second stage in which the angle θ of the blade 30 is nearly perpendicular to the wind so that the blades 30 easily rotates at high speed when the wind speed increases, and the third stage in which the blade 30 is pushed back from the state of being nearly perpendicular to the wind to the state of being nearly parallel to the wind in order to prevent the excessive rotation in strong winds. By virtue of the autonomous rotation speed control according to the three stages of the variations of the angle of the blade 30, the windmill 3 has an excellent starting performance, the efficiency is high when the windmill 3 rotates at high speed, and the excessive rotation can be controlled in strong winds.

Hereinafter, the configuration of the wind power generator 1 comprising the windmill 3 will be described. The configuration of the wind power generator 1 of the invention is not limited to the following configuration of the present embodiment.

Figure 17:
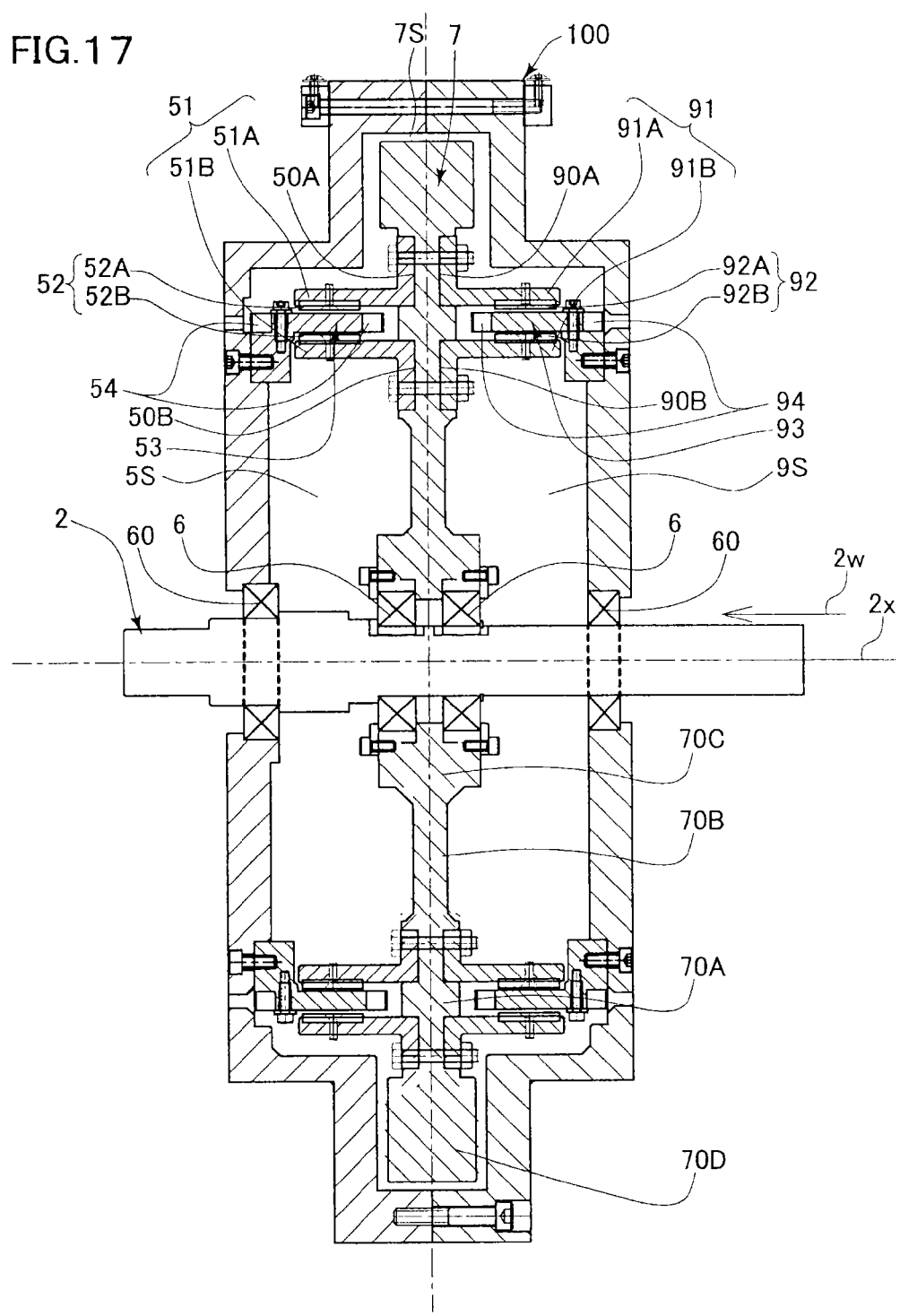
FIG. 17 is an enlarged cross-sectional view of the inside of a power generation case body in the wind power generator of FIG. 12.

The wind power generator 1 of the present embodiment is configured to comprise the windmill 3 (see FIGS. 1, 12, and 13) and the flywheel 7 (see FIG. 17). The windmill 3 has the above constitution, thereby receives the wind power from the predetermined wind receiving direction 2w to be rotated in a constant rotational direction around the predetermined rotation shaft line 2x. The flywheel 7 is arranged through a one-way clutch 6 (see FIG. 17) so that when the rotation shaft 2 increases its speed in the constant rotational direction, the flywheel 7 is in a state of rotating integrally with the rotation shaft 2 and rotates with increased speed, and when the rotation shaft 2 reduces its speed, the flywheel 7 is separated from the rotation shaft 2 to rotate inertially. In the present embodiment, the wind power generator 1 is configured to further comprise the power generator (power generation unit) 9 (see FIG. 13) which has a rotor 91 (see FIG. 17) arranged so as to be coaxial with the flywheel 7 and rotate integrally with the flywheel 7 and generates electric power by the rotation of the rotor 91 with the rotation of the flywheel 7.

Furthermore, when the power generator 9 is a second power generator, the wind power generator 1 is configured to comprise the first power generator 5 different from the second power generator 9. The first power generator 5 has a rotor 51 arranged so as to be coaxial with the flywheel 7 and rotate integrally with the flywheel 7 and generates electric power by the rotation of the rotor 51 with the rotation of the flywheel 7. In the present embodiment, as shown in FIG. 17, the first power generator 5 is provided on the downstream side in the wind receiving direction with respect to the flywheel 7, and the second power generator 9 is provided on the upstream side in the wind receiving direction.

Figure 14A:
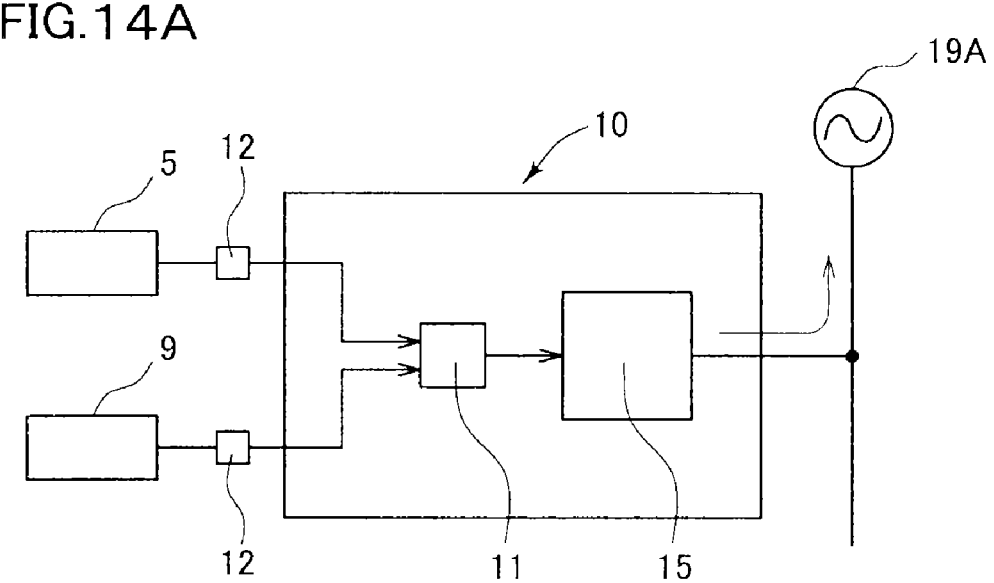
FIG. 14A is a block diagram showing in a simplified manner an example of the electrical configuration of an output portion of the wind power generator of FIG. 12.
Figure 14B:
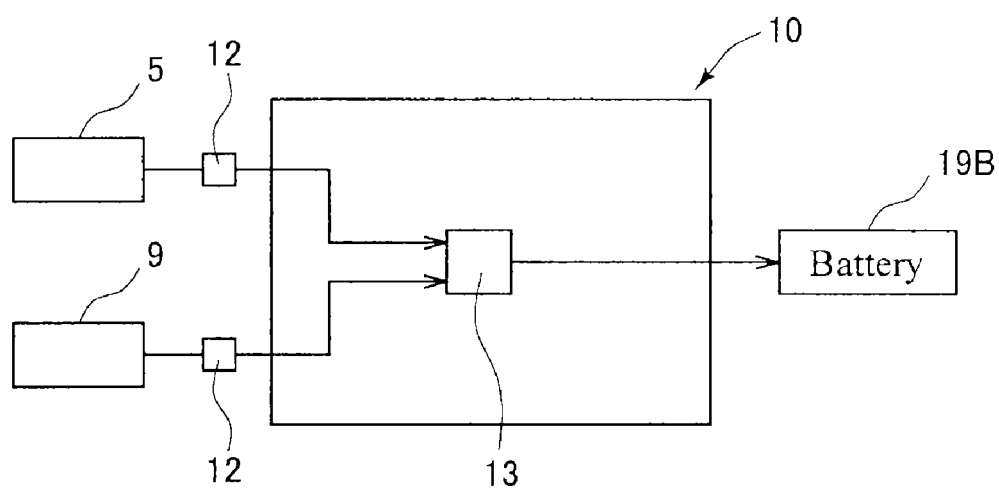
FIG. 14B is a block diagram showing a variation of FIG. 14A in a simplified manner.

As shown in FIGS. 14A and 14B, the wind power generator 1 of the present embodiment is configured to comprise an output portion (output unit) 10 which receives an input of electric powers from both the first power generator 5 and the second power generator 9 and externally outputs the electric powers together. Namely, output lines of the electric power of the first power generator 5 and the second power generator 9 are connected until reaching an external output, and the electric power is externally output by one system.

The output portion 10 can be configured as follows. As shown in FIG. 14A, for example, the three-phase AC powers generated by the first power generator 5 and the second power generator 9 are input to rectifiers 12 to be input to a set-up controller 11 and, thus, to be output at a predetermined voltage. The output is input to a power conditioner 15, and the input DC power is converted into a system power to be output. According to this configuration, the electric powers generated by the first power generator 5 and the second power generator 9 can be both supplied together to an external power system 19A, and the electric power may be sold, for example. Alternatively, the power conditioner 15 converts the electric power into AC power that can be used at home, and the AC power may be output. Further, in the output portion 10, as shown in FIG. 14B, the electric powers generated by the first power generator 5 and the second power generator 9 are both input to the rectifiers 12 to be input to a set-up controller 13, and the DC power with a predetermined voltage may be supplied to a battery (storage unit) 19B to be stored therein. Further, the electric power stored in the battery (storage unit) 19B may be supplied to an external power supply system 19A through the power conditioner 15.

Figure 15:
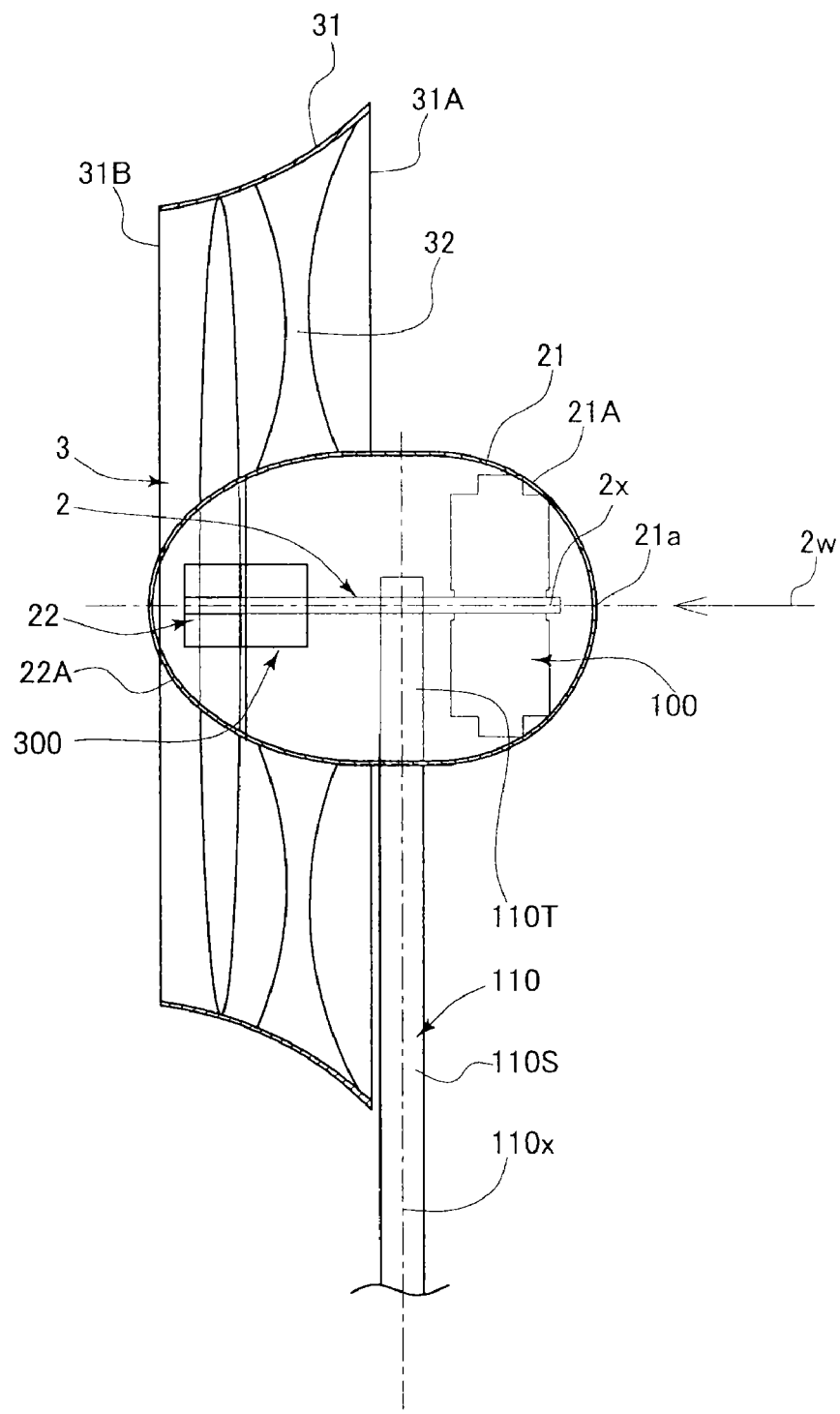
FIG. 15 is an enlarged cross-sectional view showing a windmill portion in the wind power generator of FIG. 12 in a simplified manner.

FIG. 15 is an enlarged cross-sectional view showing the wind power generator 1 of the present embodiment in a simplified manner. The windmill 3 is arranged inside a tubular wind tunnel portion (duct) 31 extending in a tubular manner so as to be coaxial with the direction of the rotation shaft line 2x of the rotation shaft 2. The tubular wind tunnel portion 31 is formed so that the opening area is reduced from the upstream side in the wind receiving direction 2w of the windmill 3 toward the downstream side. Specifically, the tubular wind tunnel portion 31 has such a curved shape that bulges inward in the radial direction in a section from an annular end 31A on the upstream side in the wind receiving direction 2w to a downstream annular end 31B. The wind taken into the tubular wind tunnel portion 31 is compressed to be supplied downstream and, thus, to be received by a downstream blade, whereby the rotation force of the windmill 3 can be increased.

In the tubular wind tunnel portion 31, a plurality of supporting members (FRP) 32 extending outward in a radial manner from an outer peripheral surface 21A of a nacelle 21 are fixed to the inner peripheral surface of the tubular wind tunnel portion 31. The supporting members 32 are provided to be irrotational with respect to the rotation shaft 2 along with the nacelle 21. The nacelle 21 stores therein the first power generator 5, the flywheel 7, the second power generator 9, the rotation shaft 2, and also the angle adjustment mechanism 300. The hub 22 and the blade 30 are provided downstream of the nacelle 21 in the wind receiving direction 2w, and the rotation force obtained in the downstream blade 30 is transmitted toward the power generators 5 and 9, located on the upstream side in the wind receiving direction 2w, through the rotation shaft 2.

As shown in FIG. 15, the nacelle 21 is attached to a column body 1105 so as to enable to change the direction in a horizontal plane according to the wind direction (so as to be rotatable around a shaft line 110x in the vertical direction of the column body 1105) along with an upper end 110T of a column (tower) 110 extending from a base portion 190 (see FIG. 12) of the earth's surface. In the present embodiment, since the tubular wind tunnel portion 31 covering the respective blades 30 is provided on the downstream side in the wind receiving direction 2w of the nacelle 21, the tubular wind tunnel portion 31 functions as unit like a rear plane varying the wind receiving direction 2w of the windmill 3. Namely, when a tubular outer peripheral surface 31C of the tubular wind tunnel portion 31 (particularly, the surface on the horizontal direction: see FIG. 12) receives wind to be rotated with respect to the upper end 110T of the column 110, and, thus, to turn the rotation shaft line 2x of the rotation shaft 2 to the upstream side in the wind receiving direction as the direction from which the wind blows.

Figure 16:
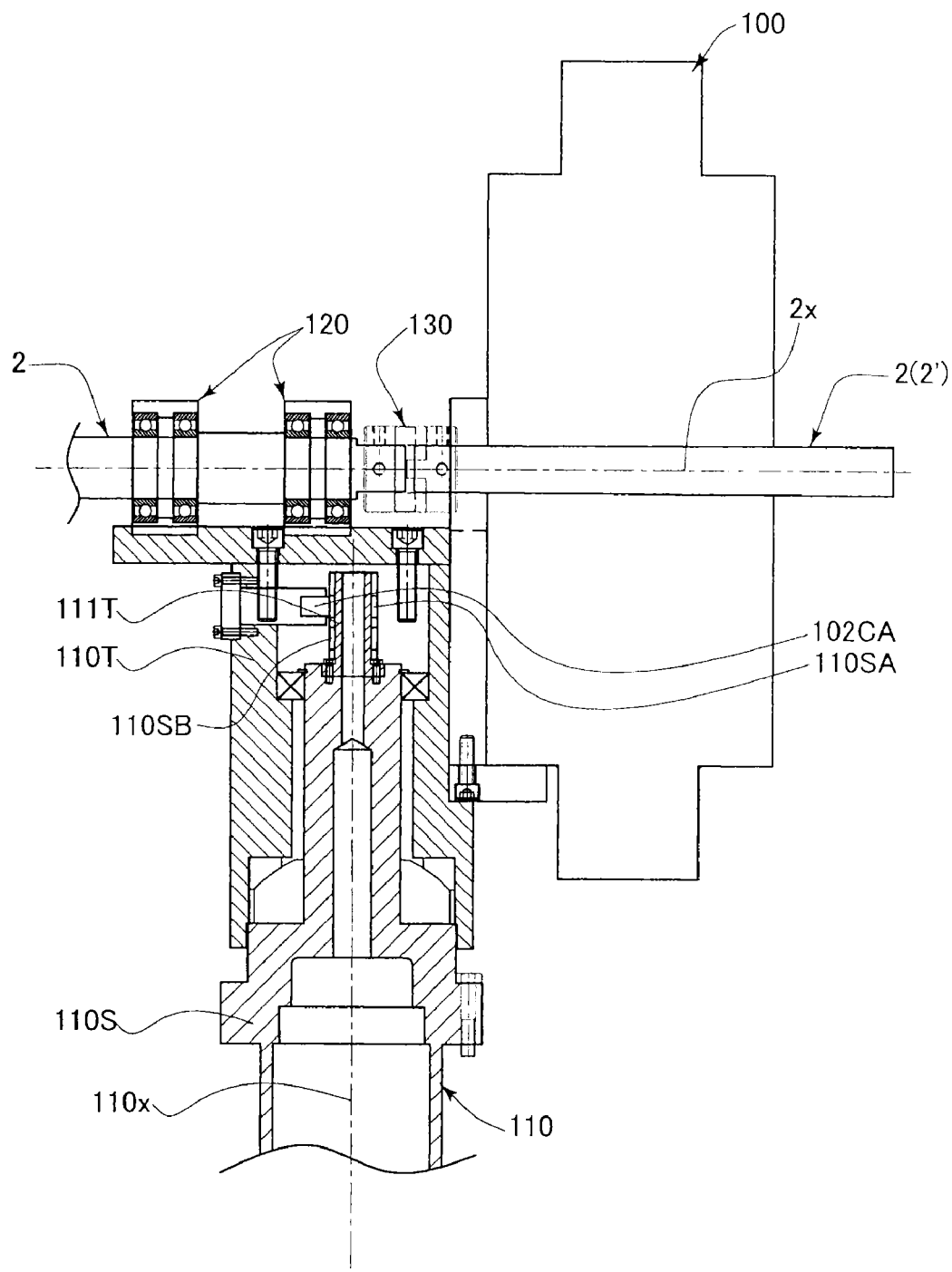
FIG. 16 is an enlarged cross-sectional view of a column portion in the wind power generator of FIG. 12.

FIG. 16 is a cross-sectional view in which the nacelle of FIG. 15 is cut along a plane passing through the shaft lines 2x and 110x. The nacelle 21 includes a power generation case body 100 where the flywheel 7, the first power generator 5, and the second power generator 9 are stored in this order from the upstream side of the wind receiving direction 2w of the windmill 3. The power generation case body 100 is fastened and fixed to the nacelle 21 by a fastening member.

As shown in FIG. 17, the power generation case body 100 includes an upstream storage space 9S storing the second power generator 9, an intermediate storage space 7S storing the flywheel 7, and a downstream storage space 5S storing the first power generator 5 in sequence from the upstream side in the wind receiving direction 2w. The power generation case body 100 has a shape in which those spaces form a string of space. The flywheel 7 is arranged in the intermediate storage space 7S, whereby the string of space is divided into the upstream storage space 9S and the downstream storage space 5S. The diameter of the tubular intermediate storage space 7S is larger than the diameters of the tubular upstream and downstream storage spaces 9S and 5S, and the flywheel 7 stored in the intermediate storage space 7S is located close to a tubular outer peripheral wall of the intermediate storage space 7S in the radial direction. Therefore, when the flywheel 7 is arranged, the upstream storage space 9S and the downstream storage spaces 5S communicate only on the outer peripheral side of the flywheel 7, and therefore, the upstream storage space 9S and the downstream storage space 5S are more reliably separated. According to this constitution, one of the upstream storage space 9S and the downstream storage space 5S is not affected by a disturbance of airflow with the rotation of the rotating body (rotors 91 or 51) in the other storage space.

The rotation shaft 2 penetrates through the power generation case body 100 in its shaft line direction and is attached to the power generation case body 100 through a bearing device 60 so as to smoothly relatively rotate with respect to the power generation case body 100 (see FIG. 17). The bearing device 60 of the present embodiment is a sealed bearing device having a sealing function such as a sealing device (O-ring or the like) and a grease, and the power generation case body 100 is sealed by the sealing function. When air is filled with atmospheric pressure, the inside of the sealed power generation case body 100 is in a state of being depressurized, for example, so as to reduce resistance (air resistance) due to the filled gas that is applied to the rotating bodies 51, 91, 7, and the like in the power generation case body 100.

In the first power generator 5 and the second power generator 9, a plurality of magnetic members 52 and 92 are arranged at predetermined intervals along the circumferential directions of the rotors (generator rotors) 51 and 91 rotatable around the rotation shaft 2. The first power generator 5 and the second power generator 9 are configured to comprise stators (generator stators) 53 and 93. The stators 53 and 93 face the magnetic members 52 and 92 so as to form an air gap, and stator coils 54 and 94 irrotational with respect to the rotors 51 and 91 are arranged in the stators 53 and 93. The electric power is generated by relative rotation between the magnetic members 52 and 92 and the stator coils 54 and 94. The larger the electric power to be generated (generated electric power), the larger the relative rotational speed. The magnetic members 52 and 92 of the present embodiment are permanent magnets, and neodymium magnet or the like can be used, for example. In the present embodiment, a ratio of the number of the magnetic members 52 and 92 to the number of the stator coils 54 and 94 is 3:4, and the three-phase AC power is output from the stator coils 54 and 94.

As shown in FIG. 16, an upper end shaft portion 111T at the upper end 110T of the column 110 is provided with slip rings 110SA and 110SB, and the output of power generation is taken from the stator coils 54 and 94 through brushes 102CA (shown in the figure) and 102CB (not shown) sliding respectively on slip rings 110SA and 110SB. The power generation output that has been taken is connected to the output portion 10 through a wiring passing through an internal space of the tubular column (tower) 110.

In order to rotatably fix to the rotation shaft 2, fixing portions 120 including a bearing device are fastened and fixed to an upper end surface of the upper end portion 110T of the column 110 by a fastening member as shown in FIG. 16. The power generation case body 100 is provided on the upstream side in the wind receiving direction from the fixing portion 120. On the upstream side in the wind receiving direction of the rotation shaft 2, the rotation shaft 2 and a rotation shaft extending portion 2' that extends the rotation shaft 2 are integrally rotatably coupled by a shaft coupling portion 130. The rotation shaft 2 penetrating through the inside of the power generation case body 100 is the rotation shaft extending portion 2'.

The stators 53 and 93 in the first and second power generators 5 and 9 are provided as tubular members protruding from the power generation case body 100 toward the inside of the case along the shaft line direction of the rotation shaft 2. In the tubular members 53 and 93, opening portions penetrating in the radial direction are formed at predetermined intervals along the circumferential direction. The opening portions are partitioned by column portions provided in the circumferential direction and extending in the shaft line direction of the rotation shaft 2, and the stator coils 54 and 94 are wound around the column portions. In the present embodiment, the winding directions are opposite between the adjacent column portions.

The first power generator 5 and the second power generator 9 of the present embodiment have, as the rotors 51 and 92, first rotor portions 51A and 91A and second rotor portions 51B and 91B coaxial with the rotation shaft 2 and rotating integrally with each other along with the flywheel 7. The rotor portions 51A and 91A and the rotor portions 51B and 91B have facing surfaces facing each other through an air gap. The same number of the magnetic members 92 are arranged on the facing surfaces at predetermined intervals in the circumferential direction and fixed by fastening members. However, the magnetic member 52A (52) and 92A (92) of the rotor portions 51A and 91A and the magnetic member 52B (52) and 92B (92) of the rotor portions 51B and 91B face each other on magnetized surfaces having polarities (magnetic poles) different from each other. The stator coils 54 and 94 of the stators 53 and 93 are located in a gap between the first rotor portions 51A and 91A and the second rotor portions 52A and 92A. A plurality of the stator coils 54 and 94 are arranged at predetermined intervals along their circumferential directions in an annular facing region on the stators 53 and 93 held respectively between the magnetic members 52, 52 of the rotating rotors 51A and 51B and between the magnetic members 92, 92 of the rotating rotors 91A and 91B.

In the first power generator 5 and the second power generator 9, the first rotor portions 51A and 91A and the second rotor portions 51B and 91B are arranged to face in the radial direction with respect to the rotation shaft line 2x of the rotation shaft 2. The first rotor portions 51A and 91A are fixed to fixing portions 50A and 90A formed on the outer peripheral side of the fixing portion 70A of the flywheel 70 so as to be coaxial with the flywheel 7 and rotate integrally with the flywheel 7. The cylindrical portions 51B and 91B forming the second rotor portions are fixed to fixing portions 50B and 90B formed on the inner peripheral side of the fixing portion 70A of the flywheel 7 so as to be coaxial with the flywheel 7 and rotate integrally with the flywheel 7.

The flywheel 7 of the present embodiment has a shaft fixing portion 70C fixed to the rotation shaft 2 through the one-way clutch 6, a disk-shaped intermediate portion 70B extending from the shaft fixing portion 70C to the outside in the radial direction, and a fixing potion 70A to which the first rotor portions 51A and 91A and the second rotor portions 51B and 9113 are integrally fixed outside in the radial direction of the intermediate portion 70B. In the present embodiment, the flywheel 7 further has an outer end portion 70D extending from the fixing portion 70A to the outside in the radial direction.

Hereinabove, although one embodiment of the invention has been described, this embodiment is just an example, and the invention is not limited thereto but can be variously modified based on the knowledge of those skilled in the art without departing from the scope of claims.

For example, the above embodiment can be modified as follows.

Figure 18:
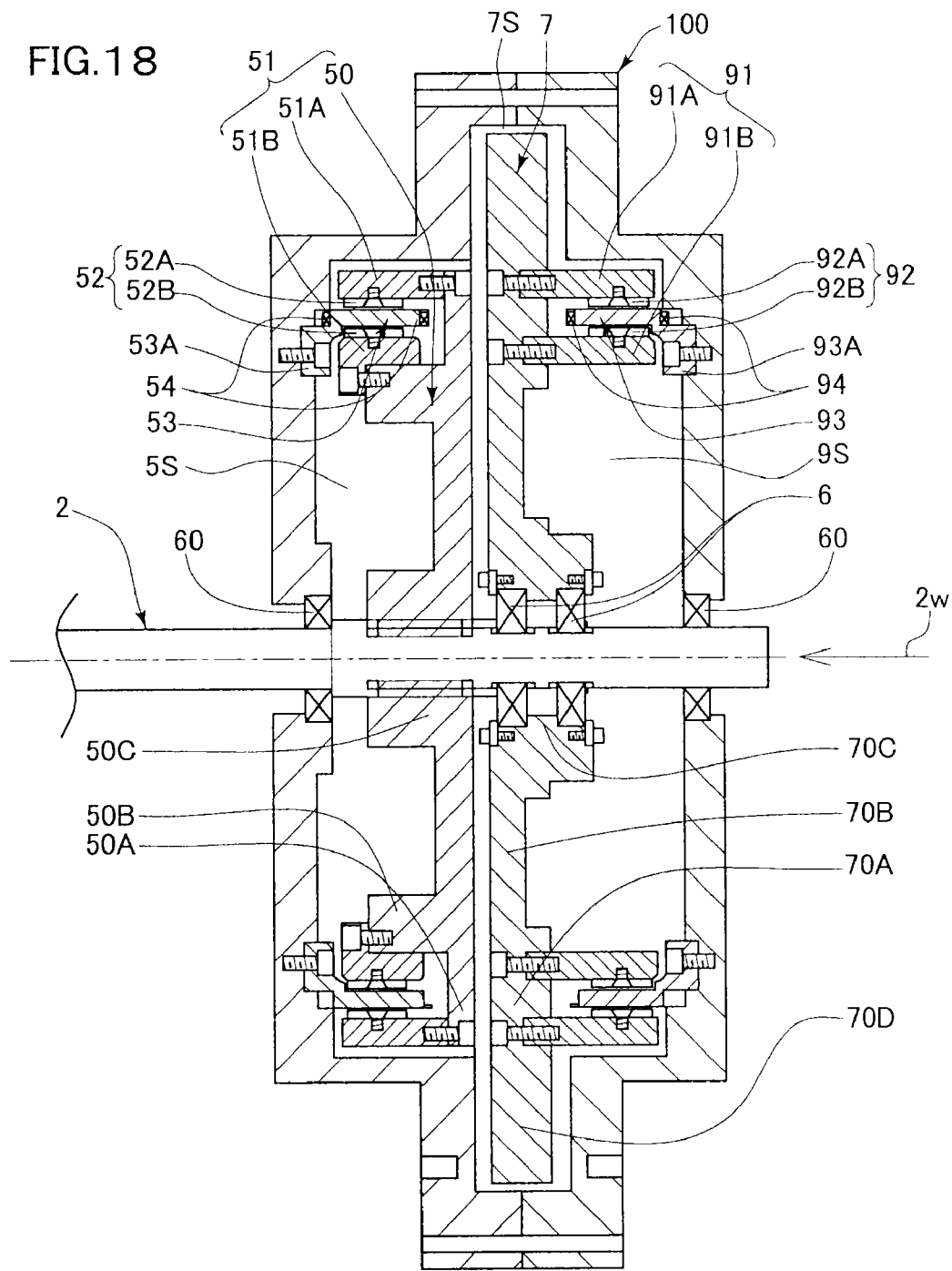
FIG. 18 is an enlarged cross-sectional view of the inside of a power generation case body of the wind power generator of the invention in an embodiment different from FIG. 12.

The wind power generator 1 of the present embodiment shown in FIG. 18 is configured to comprise the windmill 3, the first power generator (power generation unit) 5, the flywheel 7, and the second power generator (power generation unit) 9. The windmill 3 receives the wind power from the predetermined wind receiving direction 2w to be rotated in a constant rotational direction around the predetermined rotation shaft line 2x. The first power generator 5 has the rotor 51, which is arranged so as to be coaxial with the rotation shaft 2 of the windmill 3 and rotate integrally with the rotation shaft 2, and generates electric power by the rotation of the rotor 51 with the rotation of the rotation shaft 2. The flywheel 7 is coaxial with the rotation shaft 2 and arranged through the one-way clutch 6 so that when the rotation shaft 2 increases its speed in the constant rotational direction, the flywheel 7 is in an integrally rotating state with the rotation shaft 2 and rotates at an increase speed, and when the rotation shaft 2 reduces its speed, the flywheel 7 is separated from the rotation shaft 2 to rotate inertially. The second power generator 9 is different from the first power generator 5, has the rotor 91 arranged so as to be coaxial with the flywheel 7 and rotate integrally with the flywheel 7, and generates electric power by the rotation of the rotor 91 with the rotation of the flywheel 7.

The wind power generator 1 of FIG. 18 is configured to further comprise the output portion (output unit) 10 which receives the electric power inputs generated by the first power generator 5 and the second power generator 9 and externally outputs the electric powers together. Namely, the wind power generator 1 is configured so that the electric powers having different phases and generated by the first power generator 5 and the second power generator 9 are externally output by one system. The configuration of the output portion 10 in this case can be made similar to that in FIGS. 14A and 14B.

The first power generator 5 of FIG. 18 has, as the rotor 51, a first rotor portion 51A and a second rotor portion 51B which are coaxial with the rotation shaft 2 and rotate integrally with each other. The rotor portions 51A and 51B have facing surfaces facing each other through an air gap. A plurality of magnetic members 52 are arranged in the same number on the facing surfaces at predetermined intervals in the circumferential direction and fixed by fastening members. However, in the rotor portions 51A and 51B, the magnetic member 52A (52) of the rotor portion 51A and the magnetic member 52B (52) of the rotor portion 51B face each other on magnetized surfaces having polarities (magnetic poles) different from each other. The stator coil 54 of the stator 53 is located in a gap between the first rotor portion 51A and the second rotor portion 51B. A plurality of the stator coils 54 are arranged at predetermined intervals along the circumferential direction in an annular facing region on the stator 53 held between the magnetic members 52, 52 of the rotating rotor portions 51A and 51B.

In the first power generator 5, the first rotor portion 51A and the second rotor portion 51B are arranged to face in the radial direction with respect to the shaft line 2x of the rotation shaft 2. In the present embodiment, a rotor main body 50 is provided as the main body of the rotor 51. The rotor main body 50 has a shaft fixing portion 50C fixed to rotate integrally with the rotation shaft 2, a disk-shaped intermediate portion 50B extending from the shaft fixing portion 50C to the outside in the radial direction, and an outer end potion 50A provided outside in the radial direction of the intermediate portion 50B. However, the rotor main body 50 is lighter than the flywheel 7 having a large weight on the outer peripheral side and has a smaller diameter. The cylindrical portion 51A forming the first rotor portion and the cylindrical portion 51B forming the second rotor portion and having a larger diameter than the cylindrical portion 51A are fixed to the outer end portion 50A of the rotor main body 50 so as to be coaxial with the rotor main body 50 and rotate integrally with the rotor main body 50.

The second power generator 9 of FIG. 18, has as the rotor 91, the first rotor portion 91A and the second rotor portion 91B, which are coaxial with the rotation shaft 2 and rotate integrally with each other along with the flywheel 7. The rotor portions 91A and 91B have facing surfaces facing each other through an air gap, and a plurality of magnetic members 92 are arranged in the same number on the facing surfaces at predetermined intervals in the circumferential direction and fixed by fastening members. However, in the rotors 91A and 91B, the magnetic member 92A (92) of the rotor portion 91A and the magnetic member 92B (92) of the rotor portion 91B face each other on magnetized surfaces having polarities (magnetic poles) different from each other. The stator coil 94 of the stator 93 is located in a gap between the first rotor portion 91A and the second rotor portion 91B. A plurality of the stator coils 94 are arranged at predetermined intervals along the circumferential direction in an annular facing region on the stator 93 held between the magnetic members 92, 92 of the rotating rotors 91A and 91B.

In the second power generator 9, the first rotor portion 91A and the second rotor portion 91B are arranged to face in the radial direction with respect to the shaft line 2x of the rotation shaft 2. In the first rotor portion 91A, the cylindrical portion 91A forming the first rotor portion and the cylindrical portion 91B forming the second rotor portion and having a larger diameter than the cylindrical portion 91A are fixed to the flywheel 7 so as to be coaxial with the flywheel 7 and rotate integrally with the flywheel 7.

The flywheel 7 of the present embodiment has a shaft fixing portion 70C fixed to the rotation shaft 2 through the one-way clutch 6, a disk-shaped intermediate portion 70B extending from the shaft fixing portion 70C to the outside in the radial direction, and a fixing potion 70A fixing the tubular portion 91A forming the first rotor portion and the cylindrical portion 91B, forming the second rotor portion, outside in the radial direction of the intermediate portion 70B. In the present embodiment, the flywheel 7 further has an outer end portion 70D extending from the fixing portion 70A to the outside in the radial direction.

Figure 12:
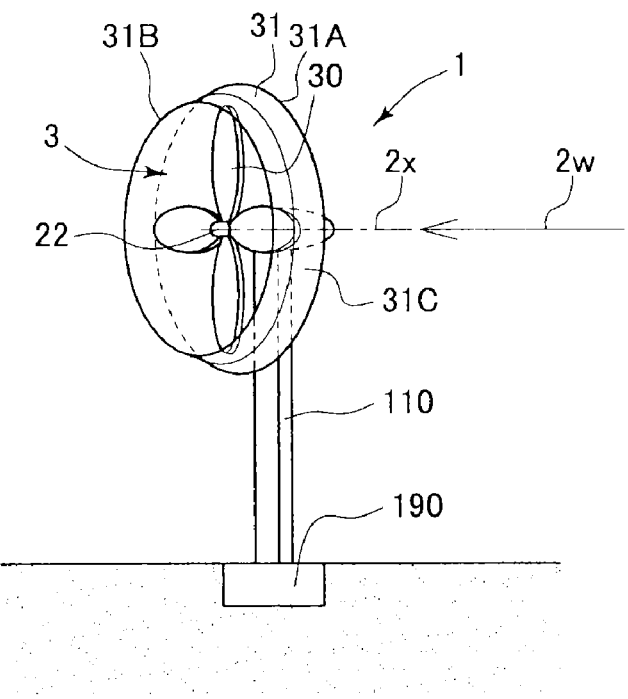
FIG. 12 is an external view showing in a simplified manner a positional embodiment of the wind power generator of the invention to which the embodiment of FIG. 1 is applicable.

As shown in FIGS. 19 to 23, a wind guide case (nacelle) 200 serving as a case (housing) of a power generation portion is provided on the windward side of the windmill 3 (blade 30). The wind guide case 200 stores therein the power generation portion, and a wind direction fin (wind direction plate portion) 202 can be integrally formed outside the wind guide case 200 (case body 201). In this example, the tubular wind tunnel portion (duct) 31 shown in FIGS. 12 and 15 is not provided outside the windmill 3, and the windmill 3 receives the wind barely (in a state of being exposed). In the case body 201 of the wind guide case 200, the cross section perpendicular to the shaft direction of the windmill 3 has a smooth outer peripheral surface having a vertically long elliptical shape or a circular shape. The end on the windward side of the case body 201 becomes thinner smoothly as it approaches the front end. The front end of the case body 201 has a circular-arc longitudinal cross section having a small curvature.

Figure 20:
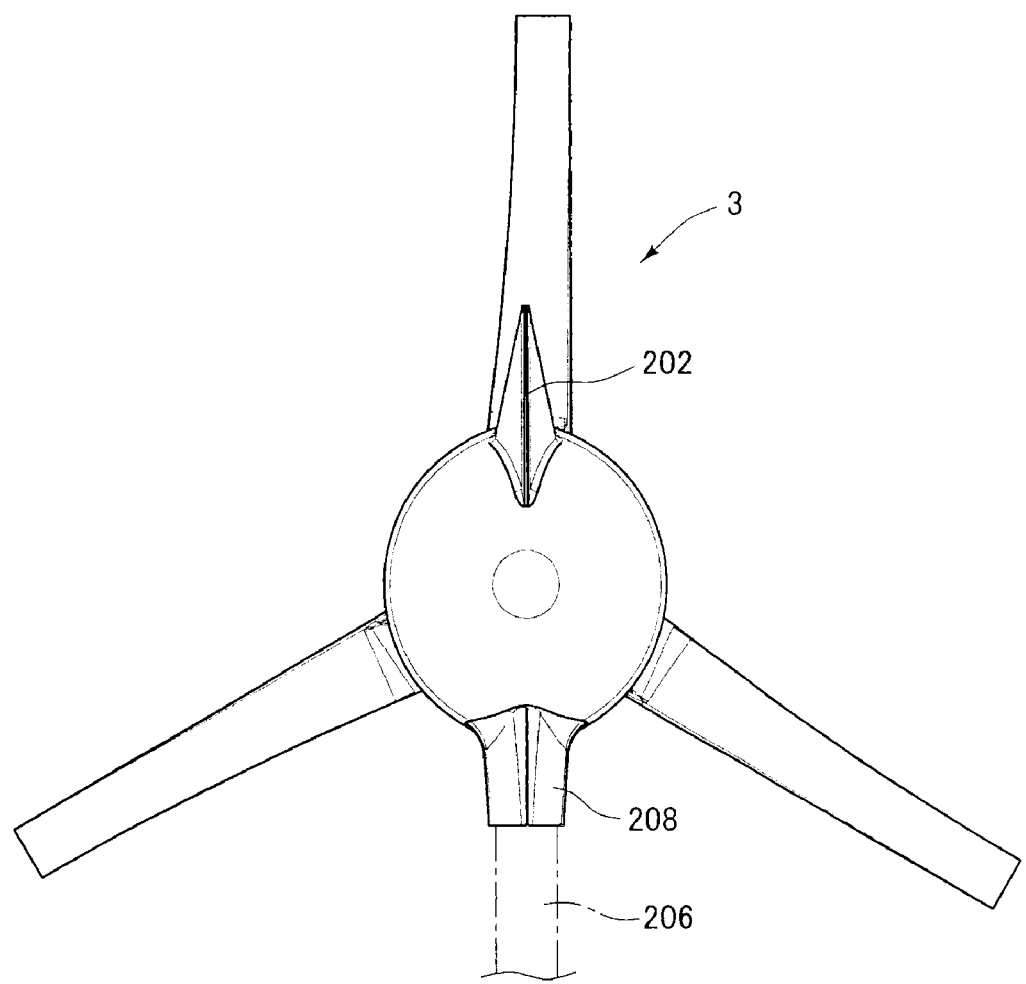
FIG. 20 is a front view of FIG. 19.
Figure 21:
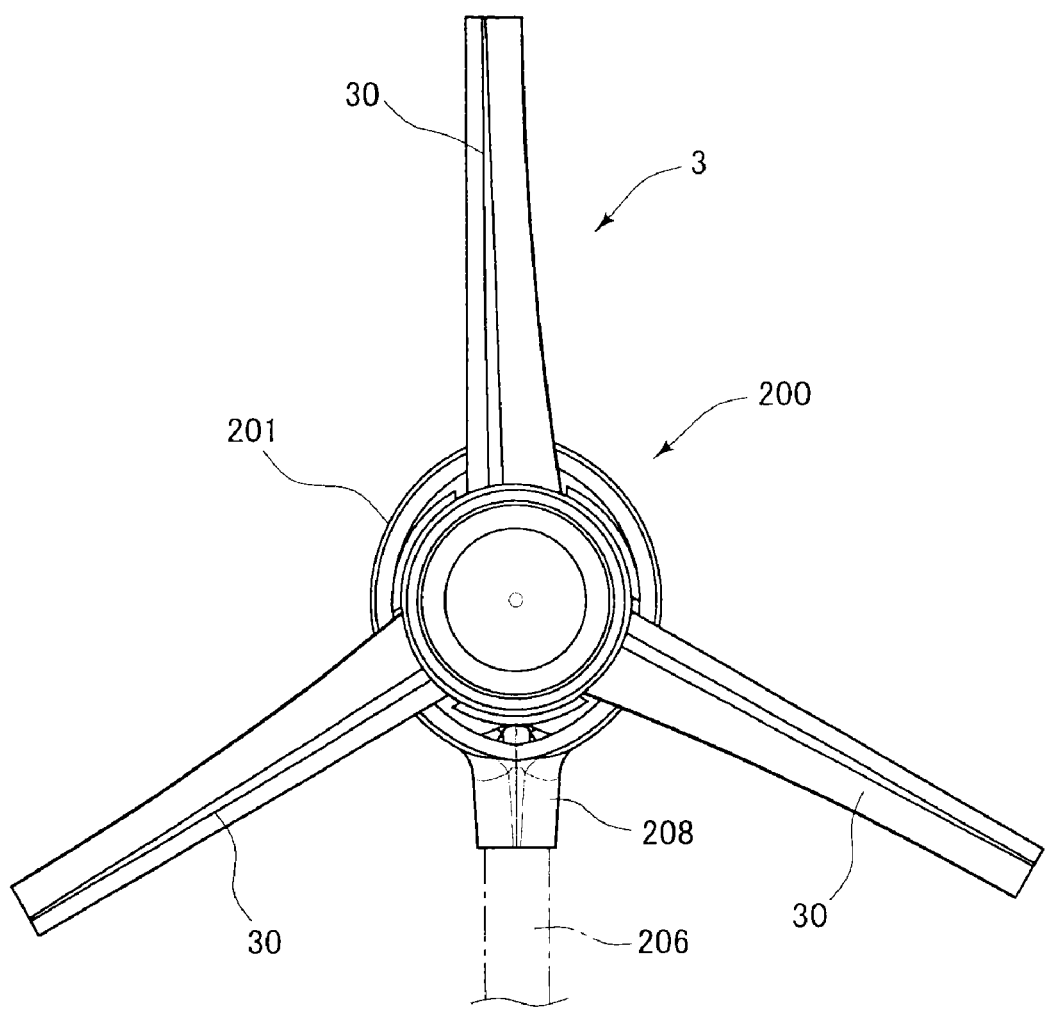
FIG. 21 is a back view of FIG. 19.

The wind direction fin 202 is provided on the outer peripheral surface of the case body 201 in a direction along the shaft direction of the windmill 3 so as to protrude outward (for example, upward) from the outer peripheral surface of the case body 201 (the wind guide case 200). The wind direction fin 202 has the orthogonal positional relationship with the rotational surface of the windmill 3. The wind direction fin 202 comprises an oblique side 203 whose length is equal to or slightly smaller than the length in the shaft direction of the case body 201 and whose height gradually increases in a circular arc manner (or linearly) from the vicinity of the front end on the windward side of the case body 201. The wind direction fin 202 further comprises a rear end portion 204 which has the largest height near the end on the leeward side of the case body 201 and descends to dig in (be bored) in a circular arc manner (in a curved manner) from the top toward the windward side (the wind direction fin 202 may comprise a rear end portion expanding in a circular arc manner on the leeward side or a rear end portion drooping linearly), and the lower end continues on the upper surface of the case body 201. The oblique side 203 of the wind direction fin 202 is formed into a sharp-pointed knife edge shape. The wind direction fin 202 has a curved surface that becomes sharp-pointed from the intermediate portion toward the rear end portion 204 as it approaches the rear end. The intermediate portion in the direction of the wind direction of the wind direction fin 202 has the largest thickness, and the wind direction fin 202 has a sharp-pointed triangular shape as shown in FIG. 20 as viewed from the windward side.

Figure 19:
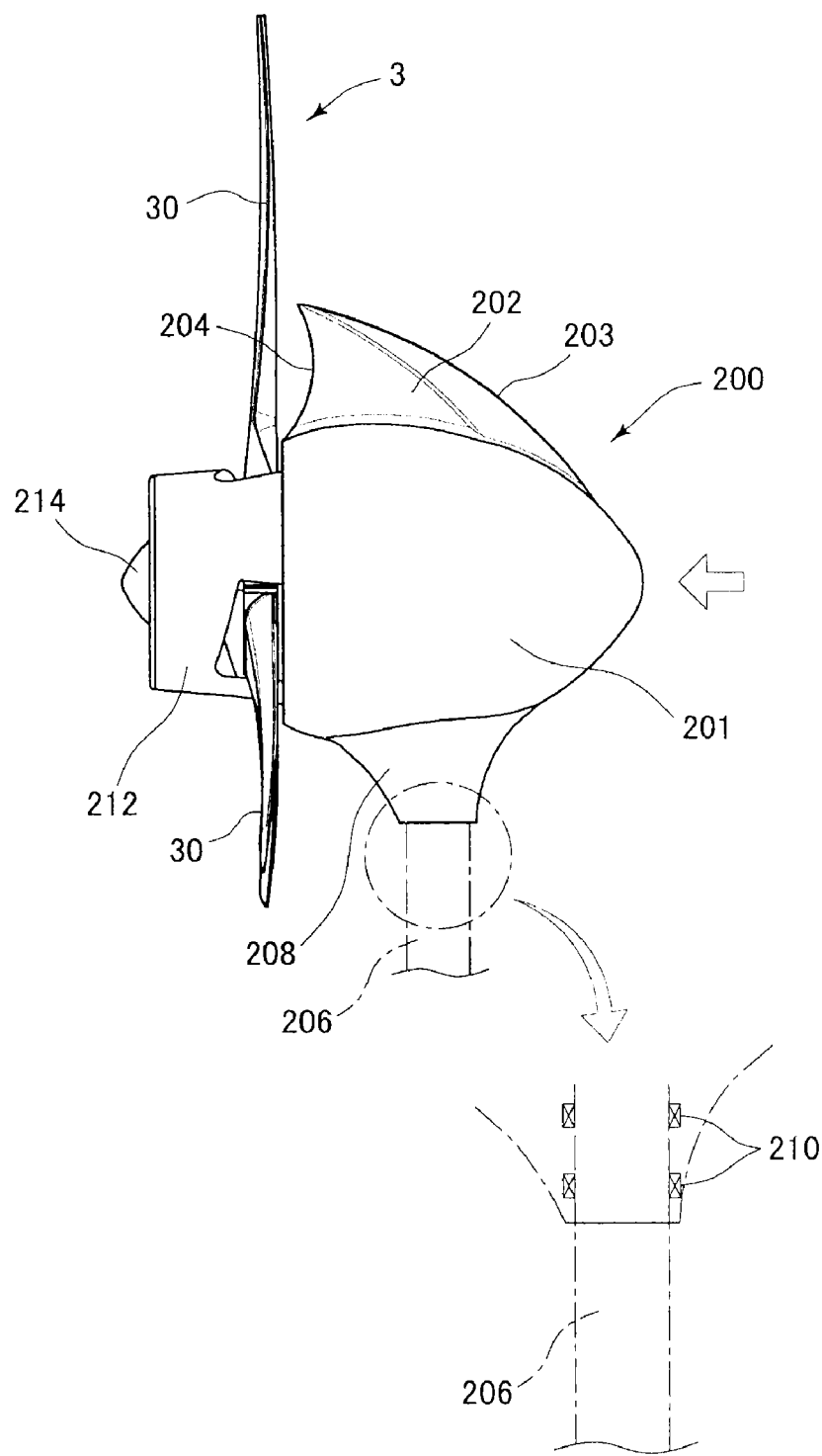
FIG. 19 is a side view of another embodiment of the invention.

A column connecting portion 208 is provided on the opposite side (lower side) of the wind direction fin 202 so that the shaft line of the case body 201 lies between those. The column connecting portion 208 connects the case body 201 with a column (pole) 206 maintaining the windmill 3 at a predetermined height, and the column 206 is connected to the column connecting portion 208. The column connecting portion 208 protrudes downward from the lower surface of the case body 201, and the end becomes thinner smoothly. The lower end of the column connecting portion 208 is formed into a cylindrical shape, and the upper end of the circular cross section of the column 206 is fitted in the cylindrical portion. As shown in FIG. 19, the wind guide case 200 and the windmill 3 are rotatably supported around a shaft line (vertical shaft) of the column 206 through a bearing 210. Consequently, the windmill 3 and the wind guide case 200 are kept in a free state so that the wind direction fin 202 of the wind guide case 200 follows the wind direction; in other words, the rotating surface of the windmill 3 always faces the wind direction.

Figure 24:
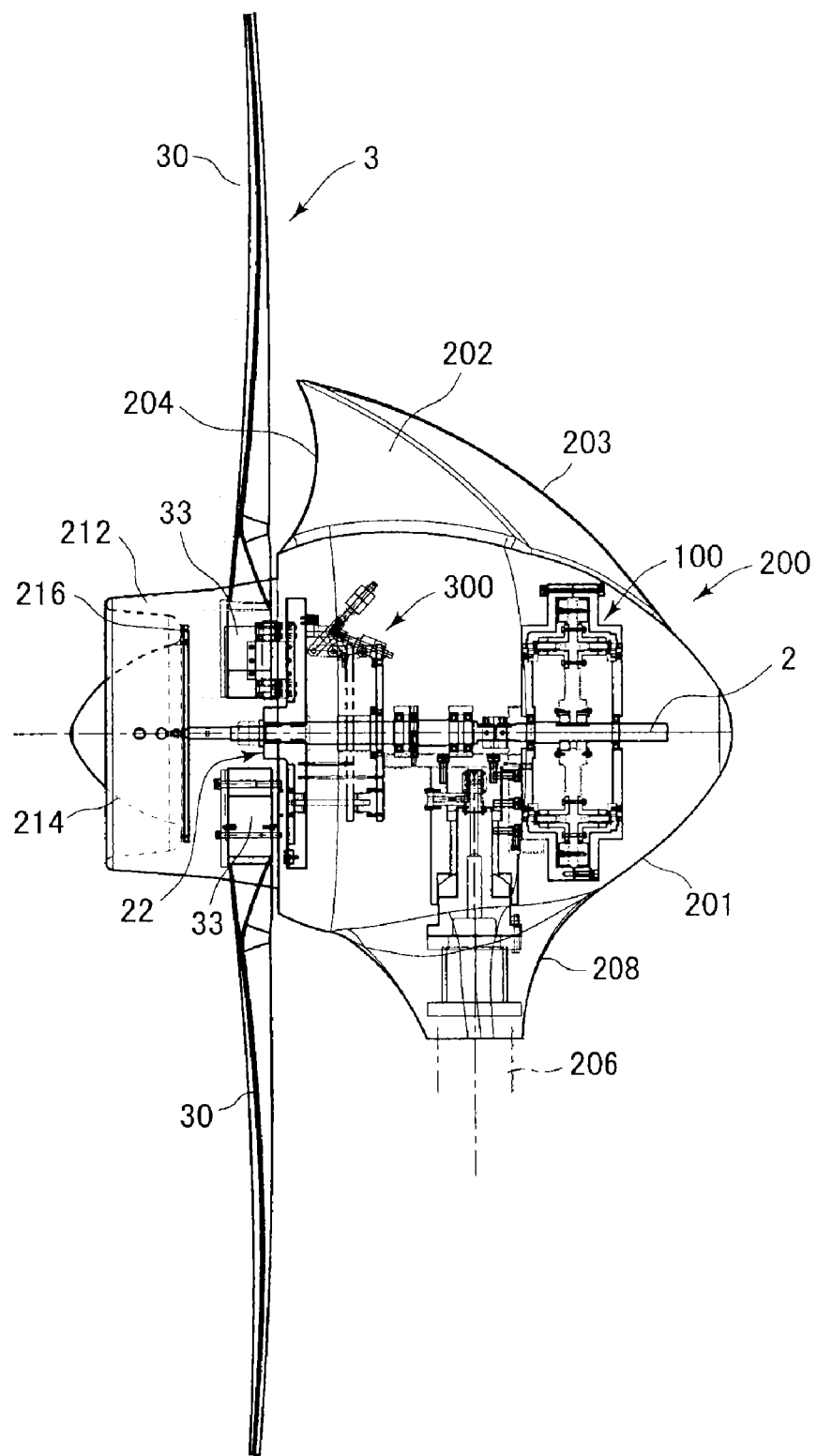
FIG. 24 is a side cross-sectional view (side perspective view) of FIG. 19.
Figure 25:
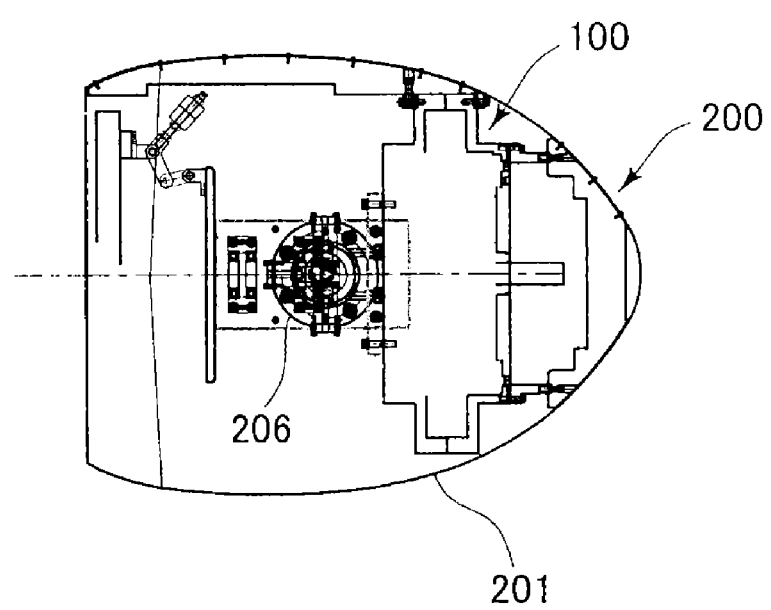
FIG. 25 is a bottom perspective view of a wind guide case 200 of FIG. 19.

FIG. 24 is a side cross-sectional view (perspective view) of a portion including the windmill 3 and the wind guide case 200. The wind guide case 200 includes the rotation shaft 2 of the windmill 3 arranged to be concentric with the center line of the wind guide case 200. The power generation case body 100 shown in FIGS. 17 and 18 is concentrically assembled with the rotation shaft 2. The angle adjustment mechanism 300 of the windmill 3 described in FIGS. 2 to 11 is stored in the wind guide case 200.

Figure 22:
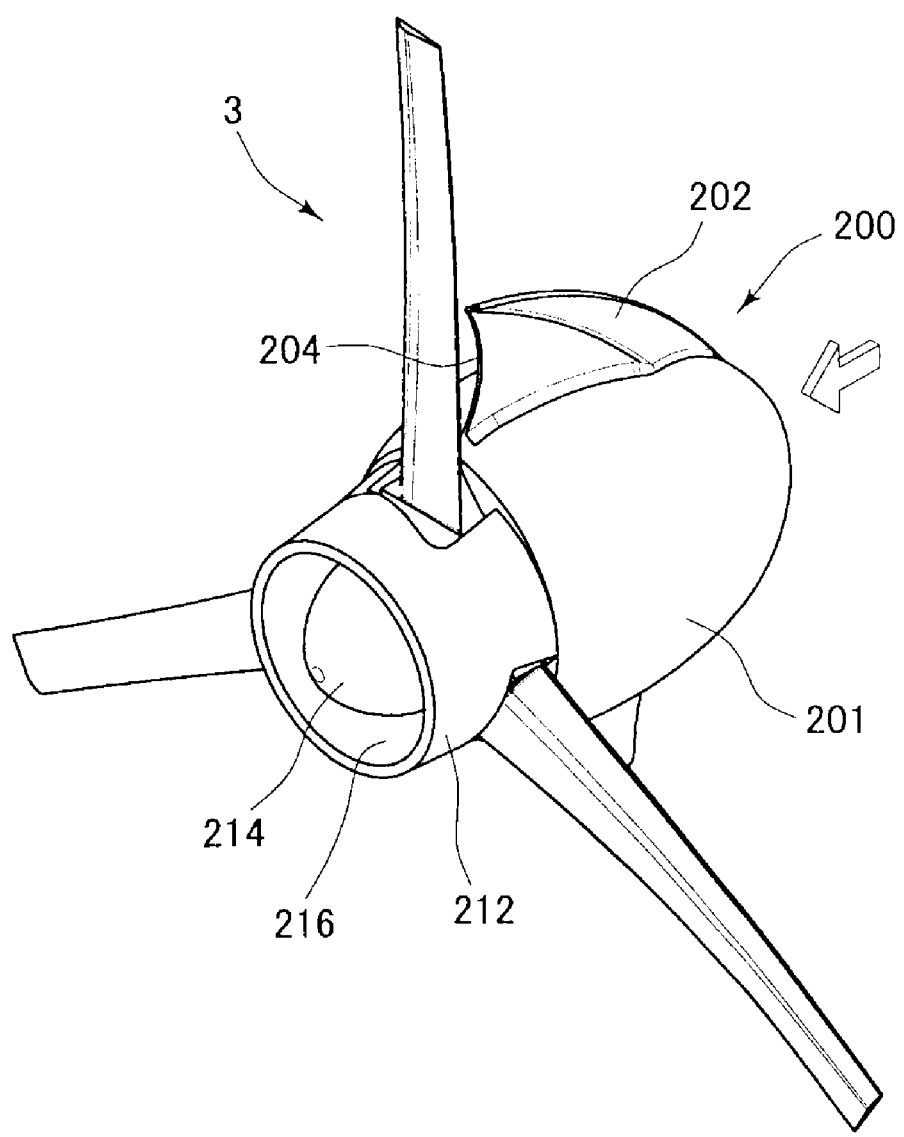
FIG. 22 is a rearward perspective view of FIG. 19.
Figure 23:
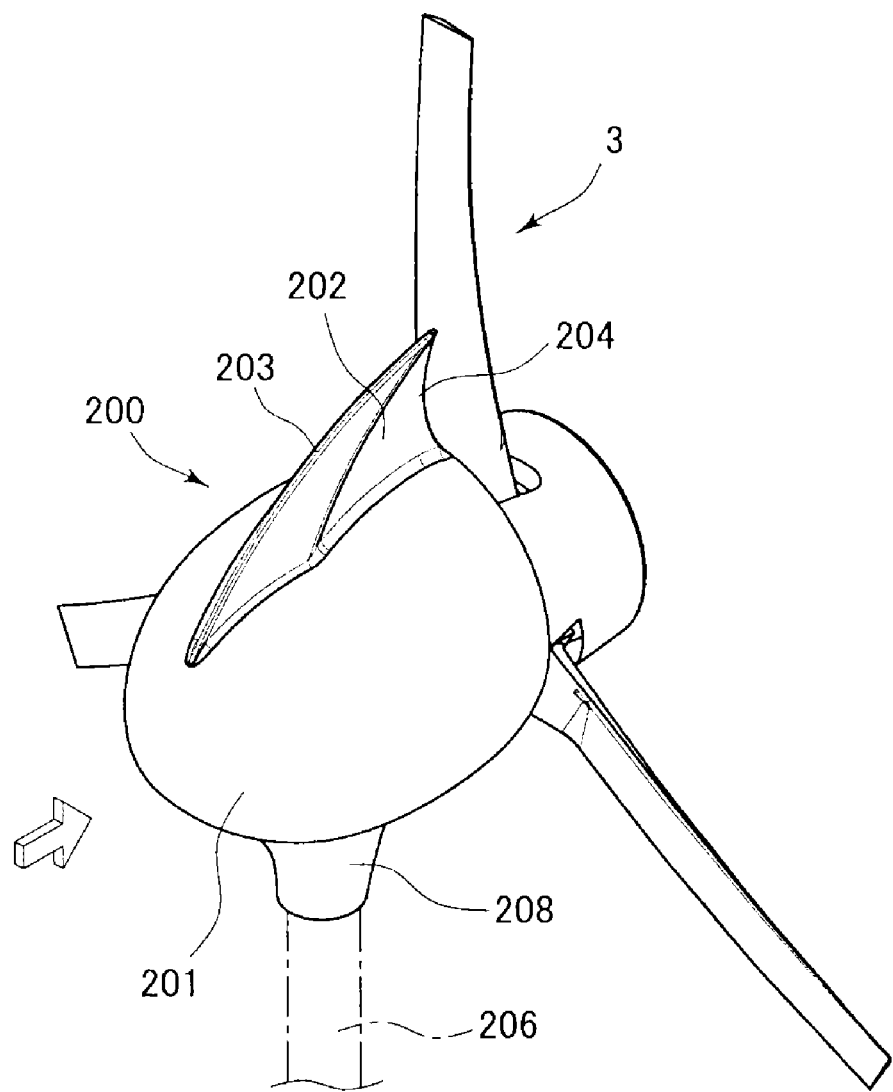
FIG. 23 is a forward perspective view of FIG. 19.

As shown in FIGS. 19, 22, and 24, the central portion of the windmill 3 (the base end portion of the blade 30) is occupied by the tubular portion 212 having a circular cross section, and the tubular portion 212 includes a cone-shaped central portion 214 conically projecting from the central portion of the tubular portion 212 to the opposite side of the wind guide case 200 (the leeward side). An annular recess 216 with cone whose width becomes smaller as it approaches toward the bottom portion is formed between the cone-shaped central portion 214 and the tubular portion 212 (a substantially cylindrical portion whose diameter is reduced in a slight tapered manner on the leeward side). The hub 22 and the blade fixing portion 33 are arranged in them. If the wind direction is significantly changed and the wind blows from the backward of the wind guide case 200, the annular recess 216 with cone receives the wind from behind to generate a rotation moment. Consequently, the wind guide case 200 and the windmill 3 in the free state change their postures (directions) by approximately 180 degrees, for example, and the postures can be changed so that the front end of the wind guide case 200 faces to the windward side (faces the wind).

EXPLANATION OF LETTERS AND NUMERALS

1 Wind power generator
2 Rotation shaft
21 Nacelle
221A Front end portion of shaft fixing portion
221B Rear end portion of shaft fixing portion
221$h$ Through-hole
22 Hub
221 Shaft fixing portion
2$x$ Rotation shaft line
2$w$ Wind receiving direction
3 Windmill
30 Blade
30$w$ Wind receiving surface
31 Tubular wind tunnel portion (duct)
300 Angle adjustment mechanism (blade angle adjustment mechanism)
33 Blade fixing portion
33A, 33B Fixing portion
33Z Rotation pivot
34 Biasing unit
35 Spindle member
36 Coupling member
362 Pressing member
37 Link mechanism
371 First link member
371A One end of first link member
371B The other end of first link member
371C Bending portion of first link member
371$y$ Rotation shaft line
372 Second link member
372A One end of second link member
372B The other end of second link member 372y Rotation shaft line
373y Rotation shaft line
38 Abutting member
39 Movable structure
51, 91 Rotor (generator rotor)
52, 92 Magnetic member
53, 93 Stator (generator stator)
54, 94 Stator coil
100 Power generation case body
W Width direction of blade
θ Angle formed by width direction of blade and shaft line direction of rotation shaft
X Wind parallel direction
Y Wind perpendicular plane
A Angle position for initial rotation
B Angle position for high speed rotation
FW Pressing force applied to blade by wind power
FA Centrifugal force (force obtained by converting centrifugal force in direction of rotation shaft line 2x by link mechanism 37)
FB Biasing force of biasing unit

What is claimed is:

1. A windmill for a wind power generator, which receives wind power to be rotated in a constant rotational direction around a predetermined rotation shaft, comprising:
   two or more blades which are provided around the rotation shaft so as to be rotated by receiving the wind power from a rotation shaft line direction of the rotation shaft and extend radially outward with respect to the rotation shaft;
   a blade fixing portion which fixes the blades to the rotation shaft in the form of, when the blade receives the wind power, receiving a pressing force so that a width direction of a wind receiving surface of the blade is nearly parallel to the wind and, in the form that the angle formed by the width direction of the wind receiving surface and the rotation shaft line direction of the rotation shaft is variable; and
   a blade angle adjustment mechanism which comprises biasing unit and a spindle member, wherein when the wind power is less than a predetermined light wind level, the biasing unit biases and holds the blade, which receives the wind power, at a predetermined angle position for initial rotation where the width direction is most nearly parallel to the wind, wherein the spindle member is coupled to the blade through a link mechanism so that when the wind power is more than the predetermined light wind level, the centrifugal force overcomes the pressing force due to the wind power applied to the blade and the biasing force of the biasing unit, whereby the blade varies to be nearly perpendicular to the wind while the spindle member displaces outward, wherein when the wind power reaches a predetermined strong wind level, the blade is made to reach a predetermined angle position for high speed rotation where the width direction of the blade is most nearly perpendicular to the wind, and wherein when the wind power further exceeds the strong wind level, the pressing force due to the wind power and the biasing force of the biasing unit overcomes the centrifugal force to push back the spindle member inward, whereby the blade is returned so that the width direction of the blade is nearly parallel to the wind.

2. The windmill for a wind power generator according to claim 1, wherein the blade fixing portion is a hinge member having a rotation pivot extending in an extending direction of the blade and two fixing plate portions in which the angle formed by them is variable around a shaft line of the rotation pivot, one of the fixing plate portions is fixed to the blade, the other is integrally rotatably fixed to the rotation shaft side, and the rotation pivot is provided on a first end side so that a second end side as the other end side rotates around the first end side in the width direction of the blade.

3. The windmill for a wind power generator according to claim 2, wherein the spindle member is link-coupled to the end side on the outer peripheral side in the width direction of the blade.

4. The windmill for a wind power generator according to claim 1, wherein the spindle member is provided for each of a plurality of the blades, and the respective spindle members are provided to be rotatable integrally with the rotation shaft; on the other hand, the spindle members are coupled to a common coupling member through the link mechanism so as to slide and move with respect to the rotation shaft according to inward and outward displacement, whereby the angle of each blade is changed so as to be in synchronism with each other and have the same angle according to a position on the rotation shaft of the coupling member sliding and moving with the inward and outward movement of the spindle members.

5. The windmill for a wind power generator according to claim 4, wherein each of the blade fixing portions is fixed to the rotation shaft through a common fixing member integrally rotatably fixed to the rotation shaft, and the biasing unit is provided so as to generate a biasing force in the rotation shaft line direction between the fixing member and the coupling member.

6. The windmill for a wind power generator according to claim 1, wherein when the wind power is less than the light wind level, the blade angle adjustment mechanism biases the blade receiving the wind power, by the biasing unit so that the width direction is nearly parallel to the wind and meanwhile abuts the abutting member against a movable structure including the blade and operated in response to the variation of the angle of the blade, to stop the operation and to thereby hold the blade at the initial rotation angle position and, on the other hand, when the wind power further exceeds the strong wind level, the blade can be returned to the initial rotation angle position where the movable structure is abutted against the abutting member.

7. The windmill for a wind power generator according to claim 6, wherein at least one of the abutting member and an abutting surface of the movable structure has an elastic member.

8. The windmill for a wind power generator comprising the requirements according to claim 4, wherein each of the blade fixing portions is fixed to the rotation shaft through a common fixing member fixed integrally rotatably with the rotation shaft and functions as the abutting member; meanwhile, the coupling member is connected to the link mechanism so as to approach the fixing member as the width direction of the blade becomes nearly parallel to the wind and functions as the structure, any one or both of the fixing member and the coupling member have an extending portion extending toward the other member, and the front end of the extending portion on the other member side is abutted against the other member, whereby the blade is held at the initial rotation angle position.

9. A wind power generator comprising:
   the windmill according to claim 1;
   a flywheel which is coaxial with the rotation shaft and arranged through a one-way clutch so that when the rotation shaft increases its speed in a constant rotational direction, the flywheel is in a state of rotating integrally with the rotation shaft and rotates with increased speed, and when the rotation shaft reduces its speed, the flywheel is separated from the rotation shaft to rotate inertially;

power generation unit that has a rotor, which is arranged so as to be coaxial with the flywheel and rotate integrally with the flywheel, and generates electric power by the rotation of the rotor with the rotation of the flywheel; and output unit that externally outputs the electric power generated by both or any one of the power generation unit.

10. A wind power generator comprising:

the windmill according to claim 8;

a flywheel which is coaxial with the rotation shaft and arranged through a one-way clutch so that when the rotation shaft increases its speed in a constant rotational direction, the flywheel is in a state of rotating integrally with the rotation shaft and rotates with increased speed, and when the rotation shaft reduces its speed, the flywheel is separated from the rotation shaft to rotate inertially;

power generation unit that has a rotor, which is arranged so as to be coaxial with the flywheel and rotate integrally with the flywheel, and generates electric power by the rotation of the rotor with the rotation of the flywheel; and output unit that externally outputs the electric power generated by both or any one of the power generation unit.

11. The wind power generator according to claim 9 further comprising, when the power generation unit is second power generation unit, first power generation unit that has a rotor, which is arranged so as to be coaxial with the rotation shaft of the windmill and rotate integrally with the rotation shaft, and is different from the second power generation unit that generates the electric power by the rotation of the rotor with the rotation of the rotation shaft, wherein the output unit externally outputs the electric power generated by both or any one of the first power generation unit and the second power generation unit.

12. The wind power generator according to claim 10 further comprising, when the power generation unit is second power generation unit, first power generation unit that has a rotor, which is arranged so as to be coaxial with the rotation shaft of the windmill and rotate integrally with the rotation shaft, and is different from the second power generation unit that generates the electric power by the rotation of the rotor with the rotation of the rotation shaft, wherein the output unit externally outputs the electric power generated by both or any one of the first power generation unit and the second power generation unit.

* * * * *